United States Patent
Robinson et al.

(10) Patent No.: US 12,049,826 B2
(45) Date of Patent: Jul. 30, 2024

(54) AUTOMATED UPDATING OF GEOLOGICAL MODEL BOUNDARIES FOR IMPROVED ORE EXTRACTION

(71) Applicant: Technological Resources Pty. Limited, Melbourne (AU)

(72) Inventors: Danielle Robinson, Red Hill (AU); Mehala Balamurali, Red Hill (AU); Arman Melkumyan, Red Hill (AU); Alexander Lowe, Red Hill (AU); Raymond Leung, Red Hill (AU); Tamara Vasey, Red Hill (AU)

(73) Assignee: TECHNOLOGICAL RESOURCES PTY LIMITED, Melbourne (AU)

( * ) Notice: Subject to any disclaimer, the term of this patent is extended or adjusted under 35 U.S.C. 154(b) by 309 days.

(21) Appl. No.: 17/415,132

(22) PCT Filed: Dec. 18, 2019

(86) PCT No.: PCT/AU2019/051399
§ 371 (c)(1),
(2) Date: Jun. 17, 2021

(87) PCT Pub. No.: WO2020/124148
PCT Pub. Date: Jun. 25, 2020

(65) Prior Publication Data
US 2022/0049606 A1    Feb. 17, 2022

(30) Foreign Application Priority Data

Dec. 18, 2018 (AU) ............................... 2018904818

(51) Int. Cl.
*E21B 44/00* (2006.01)
*E21B 44/02* (2006.01)
(Continued)

(52) U.S. Cl.
CPC .............. *E21C 41/22* (2013.01); *E21B 44/02* (2013.01); *F42D 3/04* (2013.01); *G06T 17/05* (2013.01)

(58) Field of Classification Search
CPC .......... E21C 41/22; E21C 39/00; E21C 41/00; E21C 41/16; E21B 44/02; E21B 47/00; F42D 3/04; G06T 17/05
See application file for complete search history.

(56) References Cited

U.S. PATENT DOCUMENTS

| | | |
|---|---|---|
| 6,597,992 B2 | 7/2003 | Rooney et al. |
| 7,519,515 B2 | 4/2009 | Froyland et al. |

(Continued)

FOREIGN PATENT DOCUMENTS

| | | |
|---|---|---|
| CL | 200802467 | 10/2008 |
| CL | 201300985 | 3/2014 |

(Continued)

OTHER PUBLICATIONS

Balamurali, M. and Melkumyan, A., "Multivariate Outlier Detection in Geochemicals Data," IAMG2015—Proceedings F1508, pp. 602-610.

(Continued)

*Primary Examiner* — Carib A Oquendo
(74) *Attorney, Agent, or Firm* — Banner & Witcoff, Ltd.

(57) ABSTRACT

A method for adjusting a surface of an exploratory data model of a geological domain to take into account blast hole data, the method comprising; drilling a plurality of blast holes proximal to the geological domain; recording blast hole data samples for each of the blast holes in an electronic data storage apparatus; operating a processing assembly in data communication with said storage apparatus according to instructions stored in a memory accessible to the processing assembly to perform the following acts: labelling each (Continued)

said data sample as domain or non-domain; determining blast hole boundary samples for the geological domain at each of a number of elevations to produce blast hole boundaries for the geological domain; comparing the blast hole boundaries to a surface of the exploratory data model; adjusting the surface based on the blast hole boundaries for the geological domain to generate an adjusted surface; and mining the geological domain based on the adjusted surface to thereby improve efficiency of ore extraction.

20 Claims, 17 Drawing Sheets

(51) Int. Cl.
    *E21C 41/22*        (2006.01)
    *F42D 3/04*         (2006.01)
    *G06T 17/05*       (2011.01)

(56) References Cited

U.S. PATENT DOCUMENTS

| | | | | |
|---|---|---|---|---|
| 9,773,075 | B2* | 9/2017 | Carter | E21C 41/16 |
| 2009/0256412 | A1* | 10/2009 | Nieto | E21C 41/26 |
| | | | | 382/109 |
| 2012/0323495 | A1* | 12/2012 | Zhou | E21C 39/00 |
| | | | | 702/9 |
| 2013/0169961 | A1* | 7/2013 | Kraft | E21C 41/30 |
| | | | | 299/13 |
| 2014/0144342 | A1 | 5/2014 | Bye | |
| 2019/0048708 | A1* | 2/2019 | Palmer | E21B 47/092 |

FOREIGN PATENT DOCUMENTS

| | | |
|---|---|---|
| CL | 20150009 | 8/2015 |
| CL | 201502482 | 4/2016 |
| CN | 105678843 A | 6/2016 |
| CN | 106194181 B | 4/2017 |
| CN | 106560865 A | 4/2017 |
| WO | 2014005188 A1 | 1/2014 |
| WO | 2014134655 A1 | 9/2014 |

OTHER PUBLICATIONS

Balamurali, M. and Melkumyan, A., "Geological Domain Classification Using Multiple Chemical Elements and Spatial Information," ResearchGate, May 2015, pp. 195-203.
Dec. 12, 2022—(CL) Office Action—App 202101618.
Dec. 12, 2022—(CL) Search Report—App 202101618.
Apr. 14, 2020—(WO) International Search Report and Written Opinion—Appln No. PCT/AU2019/051399.

* cited by examiner

FIG. 1A  vertical cross-section

AUTOMATED UPDATING OF GEOLOGICAL MODEL BOUNDARIES FOR IMPROVED ORE EXTRACTION

CROSS-REFERENCE TO RELATED APPLICATIONS

This application is a U.S. National Stage application under 35 U.S.C. § 371 of International Application PCT/AU2019/051399 (published as WO 2020/124148A1), filed Dec. 18, 2019, which claims the benefit of priority to AU Application No. 2018904818, filed Dec. 18, 2018. Each of these prior applications is hereby incorporated by reference in their entirety.

TECHNICAL FIELD

The present invention concerns improved mining methods for increasing the efficiency of mining operations to maximize ore extraction whilst minimizing inadvertent mining of waste. The invention relates to automated methods for improving models of geological domains such as the boundaries of mineralized ore deposits, which are referenced during mining to guide mining rigs.

BACKGROUND ART

Any references to methods, apparatus or documents of the prior art are not to be taken as constituting any evidence or admission that they formed, or form part of the common general knowledge.

Geological domains, for example subterranean 3D mineralized deposits, are often modelled based on exploration hole information and supported by 3D space mapping. Identification and separate treatment of subdomain regions (located within domains modelled on the basis of the exploration hole information) has the potential to significantly increase the robustness of the models and improve their reconciliation with the production outcomes.

It is commonly known to produce geological models using data from exploration/resource evaluation ("exp/RE") drilling campaigns. For example, FIGS. 1A and 1B depict a common mining scenario where stratigraphic information is obtained by examining core specimens extracted from the drilled holes 101. Alternatively, domain boundaries can be established from geophysical measurements taken while drilling—e.g., measurements of natural gamma radiation emitted by the rock mass.

The drill holes 101 are generally 25-200 m apart and tens to hundreds of meters deep. Within each hole, data is collected at an interval of, for example, 2 m along the length of the drill hole. The measurements will typically include the position (east, north, elevation) data along with the assay variables of interest, for example iron (Fe), silica (SiO2), alumina (Al2O3), phosphorus (P), manganese (Mn), loss on ignition (LOI), sulphur (S), titanium oxide (TiO2), calcium oxide (CaO) and magnesium oxide (MgO). The corresponding geological domains (which are typically allocated by a human geologist) and the drill-hole identification code are recorded for each hole. The main characteristics of the exp/RE data are high resolution along the vertical Z-axis and sparse sampling in the x-y plane. Geologists typically interpolate the boundary at locations (dotted lines 103) between the drilled holes based on an understanding of the geological setting. The time and effort required to "join up" these vertical slices 107 to form a preliminary 3D surface model can be substantial. A visual representation of a 3D surface model, as might be displayed on a computer model typically appears as a 3D triangulated polygon. An example of such a display 105 is shown in FIG. 1C. In this display the apexes of the triangles are defined by the exploration drilling sample points.

Since the drill holes are spaced out on an X-Y grid-like layout, with drill hole spacing typically in the range of 25 to 200 m between drill collars, the horizontal data collection points are sparse and thus boundaries modelled between drill holes are known to have inaccuracy and uncertainty associated with them. Nevertheless domain boundary models based on the drill holes are fit for purpose in terms of defining new deposits and long term value planning requirements. However, at the mining scale, this inaccuracy is problematic because it can result in valuable ore deposits going unmined or in unnecessary resources being spent on mining waste.

Even within deposits that are actively being mined, updates to geological domain models usually only consider RC/diamond drilling (often referred to as "infill drilling") that is sampled and interpreted in the same way as the exploration/RE drill data.

Another type of drilling is production or "blast hole" drilling. Assay samples from the blast holes are taken across horizontal cross-sections at substantially equal elevations in the z direction as illustrated in FIGS. 2A and 2B. The assay sample measurements made from each blast hole typically include the hole position (east, north, elevation) along with chemical assay variables of interest: iron (Fe), silica (SiO2), alumina (Al2O3), phosphorus (P), manganese (Mn), loss on ignition (LOI), sulphur (S), titanium oxide (TiO2), calcium oxide (CaO) and magnesium oxide (MgO).

Blast hole assay sample data differs from the previous exploration drilling data due to the assay samples being denser in the x-y plane and having relatively low z-resolution. The blast holes are generally 5 m apart and non-uniformly sampled in the x-y plane, for example they are not aligned with a grid. The blast holes are typically 10-12 m in depth and assayed samples and logging information are available only as an average along this length.

It is known to model 3D geological domains as a plurality of blocks. "Block data" consists of measurements of mineralised, waste and hydrated data for each block making up the 3D geological domain. The measurements include the position (east, north, elevation) and the size of each dimension along with the chemical species of interest and the corresponding geological domains.

In order to conduct mining operations with improved efficiency there is a need to model as accurately as possible, given the data available, the location of all geological boundaries within the primary geological model and thus the sub-blocked model. The issues with the density of the blast data, the difficulty and multi-dimensional nature of domain definitions and the poor vertical resolution of the assay sample data need to be addressed in order to provide accurate and updatable boundary models suitable for an autonomous mining system.

SUMMARY OF THE INVENTION

According to a first aspect of the present invention there is provided a method for adjusting a surface of an exploratory data model of a geological domain to take into account blast hole data, the method comprising;
    drilling a plurality of blast holes proximal to the geological domain;

recording blast hole data samples for each of the blast holes in an electronic data storage apparatus;

operating a processing assembly in data communication with said storage apparatus according to instructions stored in memory accessible to the processing assembly to perform the following acts:

labelling each said data sample as domain or non-domain;

determining blast hole boundary samples for the geological domain at each of a number of elevations to produce blast hole boundaries for the geological domain;

comparing the blast hole boundaries to a surface of the exploratory data model;

adjusting the surface based on the blast hole boundaries for the geological domain to generate an adjusted surface; and mining the geological domain based on the adjusted surface to thereby improve efficiency of ore extraction.

Adjusting the surface preferably includes displacing points of the exploratory data model defining the surface to reduce error between the surface and the blast hole boundaries.

In a preferred embodiment of the present invention adjusting the surface of the exploratory data model includes extrapolating to make further adjustments to the said surface at one or more levels beneath a current elevation of the blast hole data.

Preferably the determining of blast hole boundary samples includes associating a domain likelihood with each of the blast hole data samples.

In a preferred embodiment of the present invention the method includes disregarding likelihood results for domains that are spatially displaced from the blast hole samples by more than a threshold value.

The method may include calculating an error-displacement likelihood for each of the blast hole samples.

Determining the error-displacement likelihood of the domain is preferably performed by multiplying the domain likelihood for said sample by a percentage of the sample length overlapping said domain.

The method preferably includes estimating a displacement likelihood distribution at a location where blast hole data samples have not been taken.

The step of estimating the displacement likelihood distribution at the location where blast hole data samples have not been taken may be performed by extrapolation using any one of: a Support Vector Machine, a Gaussian Process or an inverse-distance-squared procedure.

Preferably the method includes applying a displacement from the displacement likelihood distribution to the surface of the exploratory data model to generate the adjusted surface.

Preferably the determining of blast hole boundaries for the geological domain at each of a number of elevations comprises identifying domain data samples neighboring non-domain data samples at each of the elevations.

In a preferred embodiment of the present invention the determining of blast hole boundaries based on domain data samples neighboring non-domain data samples at each of the elevations comprises calculating a local entropy value for domain data samples neighboring non-domain data samples and deeming a sample to be a boundary sample upon the local entropy value exceeding a threshold value.

The method preferably includes operating the processing assembly to discard outlier samples by performing data sample clustering for the blast hole samples.

The method may include operating the processing assembly to perform the clustering by detecting multivariate outliers of the blast hole data samples.

In one embodiment the method includes operating the processing assembly to perform a Minimum Covariance Discriminant (MCD) based procedure on the blast hole data samples to detect outliers.

The MCD based procedure may include maximum hull distance outlier detection.

The MCD based procedure may further include maximum silhouette local-search outlier detection.

In another embodiment the method includes operating the processing assembly to discard outlier samples by applying a t-distributed Stochastic Neighbor Embedding (t-SNE) based procedure to the blast hole data samples to detect outliers.

Preferably the t-SNE based procedure includes spectral clustering to group together samples having similar characteristics to thereby segregate the outliers.

Preferably ensemble clustering is performed to detect stable clusters over multiple applications of t-SNE.

In a preferred embodiment of the invention the method includes detecting latent sub-domains.

Preferably the method includes operating the processor assembly to update a grade block model for the domain based upon the adjusted surface.

The method may include operating the processor assembly to re-estimate ore grade values for blocks of the grade block model subsequent to said updating.

According to a further aspect of the present invention there is provided a guidance system for assisting in mining a geological domain of interest, the system including:

a plurality of blast hole drilling rigs for producing blast hole samples;

at least one analysis assembly arranged to receive the blast hole samples and produce corresponding blast hole sample data;

a network data storage device in data communication with the at least one analysis assembly via a data network and storing an exploratory model of the geological domain of interest;

a computer server programmed with a model adjustment software product to receive and process the blast hole sample data from the at least one analysis assembly for a number of positions in proximity to the geological domain of interest and to adjust the exploratory model based on the blast hole sample data to thereby produce an adjusted domain model;

a number of blast hole drilling rigs each including a steering assist assembly in data communication with the network data storage device to steer relative to the geological domain with reference to the adjusted domain model for accurate mining of the geological domain.

The at least one analysis assembly may comprise at least one down-hole assay assembly of one or more of the plurality of blast hole drilling rigs.

The steering assist assembly may comprise a visual display mounted to the blast hole drilling rig for display to a human operator of the rig.

The drilling rig may be autonomous wherein the steering assist assembly includes an automatic steering control system which is coupled to a power steering system of said rig.

According to another aspect of the present invention there is provided system for adjusting a surface of an exploratory data model of a geological domain to take into account blast hole data:

a memory storing instructions for one or more procedures; and a processing assembly configured to execute the one or more procedures stored in the memory;

wherein the one or more procedures, when executed by the processing assembly cause acts to be performed including:

recording blast hole data samples for each of the blast holes in an electronic data storage apparatus;

labelling each said data sample as domain or non-domain;

determining blast hole boundary samples for the geological domain at each of a number of elevations or "mining benches" to produce blast hole boundaries for the geological domain;

comparing the blast hole boundaries to a surface of the exploratory data model;

adjusting the surface based on the blast hole boundaries for the geological domain to generate an adjusted surface; and displaying the adjusted surface on a display for viewing by a user.

According to another aspect of the present invention there is provided a method for adjusting a surface of an exploratory data model of a geological domain to take into account production blast hole drilling data.

According to a further aspect of the present invention there is provided a system for adjusting a surface of an exploratory data model of a geological domain to take into account production blast hole drilling data.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1A is a stylized subterranean vertical cross section through which a number of exploratory drill hole samples have been drilled wherein transitions in the core samples correspond with a domain of interest.

DETAILED DESCRIPTION OF PREFERRED EMBODIMENTS

Figure 3:
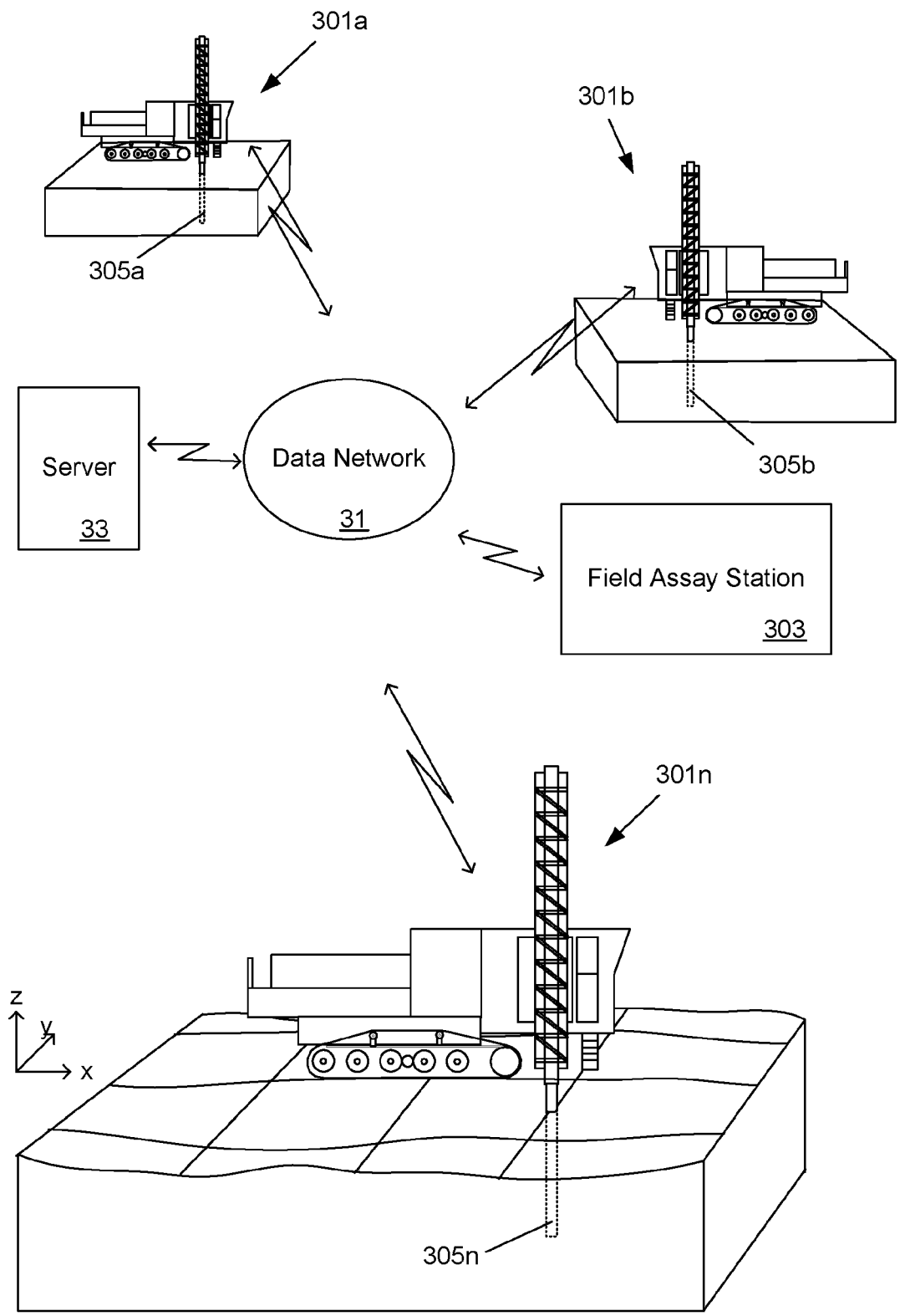
FIG. 3 illustrates drilling rigs making blast hole assay samples wherein some of the samples are assayed down-hole and some are assayed at a Field Assay Station with the assay data being relayed to a remote server via a data network.

FIG. 3 depicts mobile blast hole drilling rigs $301a, \ldots, 301n$ in the process of drilling blast holes $305a, \ldots, 305n$. The X,Y (surface) positions at which the blast holes are drilled are logged and samples from the blast holes are assayed.

The samples are typically assayed at a field assay station 303 (which may be on site or far away) to determine mineral concentrations and ratios of minerals that characterize the geological domains into which the blast holes have been drilled. In recent years down-hole assaying using pulsed fast and thermal neutron activation (PFTNA) has also become possible. Such a system is available from CSIRO and its French partner Sodern. The positional data and assay data comprise a blast hole assay data sample.

The assay data that is collected from the blast hole drilling is relayed via a data network 31 to a central data processing system, which is represented in FIG. 3 by computer system 33.

Figure 4:
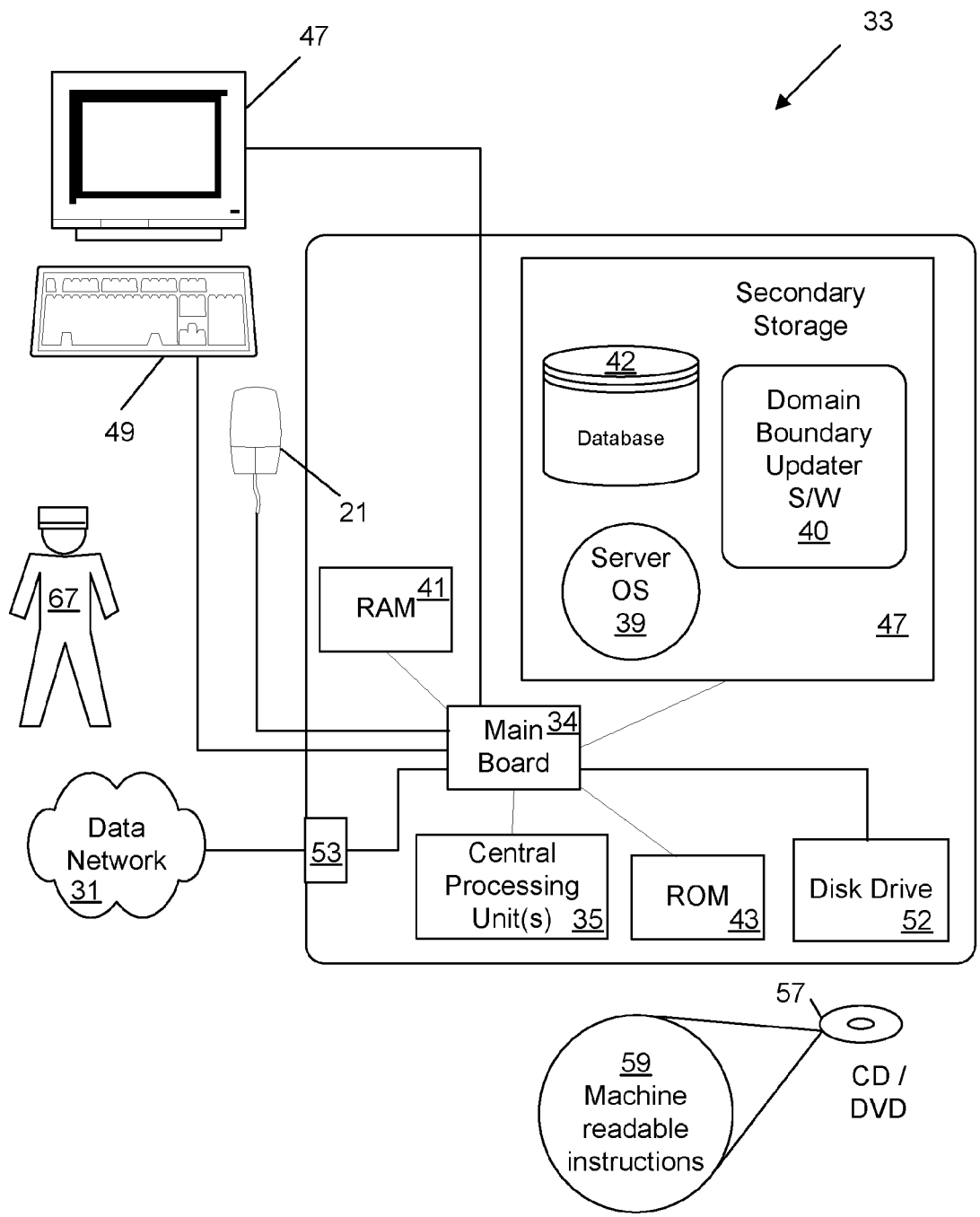
FIG. 4 is a block diagram of the remote server of FIG. 3.

FIG. 4 comprises a block diagram of the server 33. The server 33 includes a memory in the form of a secondary storage 47, which is typically implemented by a magnetic or solid state data drive and which stores a server operating system, for example Microsoft Windows Server, and Linux Ubuntu Server are two examples of such an operating system.

Figure 1B:
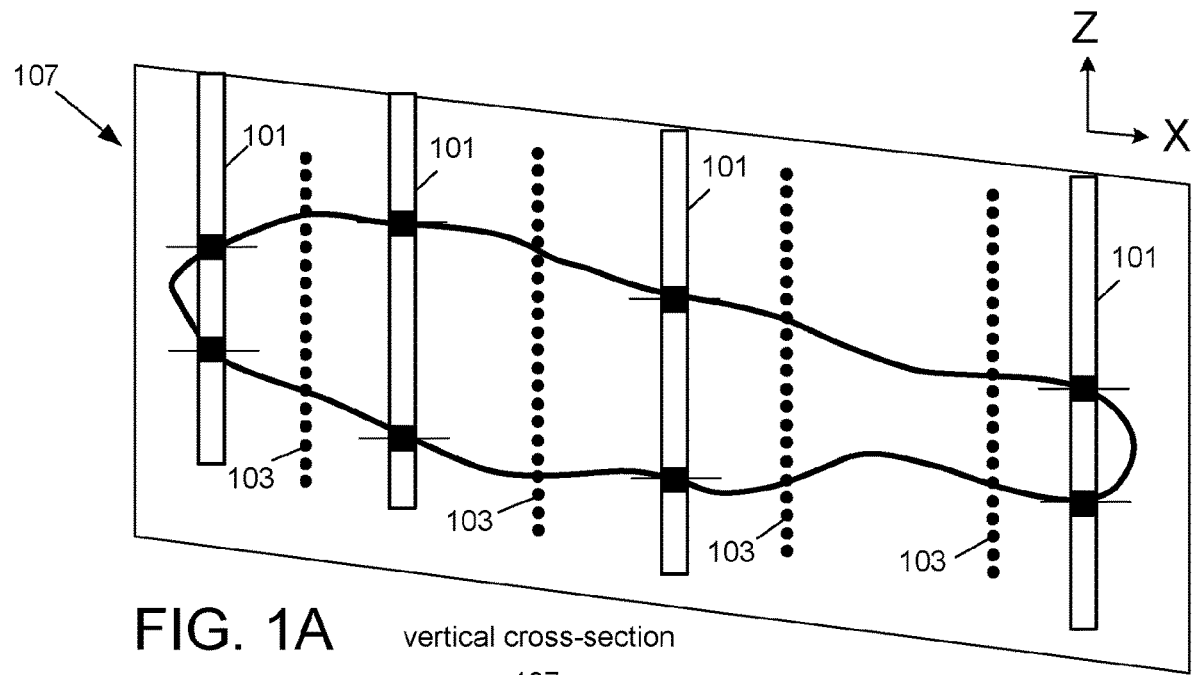
FIG. 1B shows a series of vertical subterranean cross sections similar to the cross section of FIG. 1A wherein an evolution in the shape of the domain from section to section can be discerned.
Figure 1B:
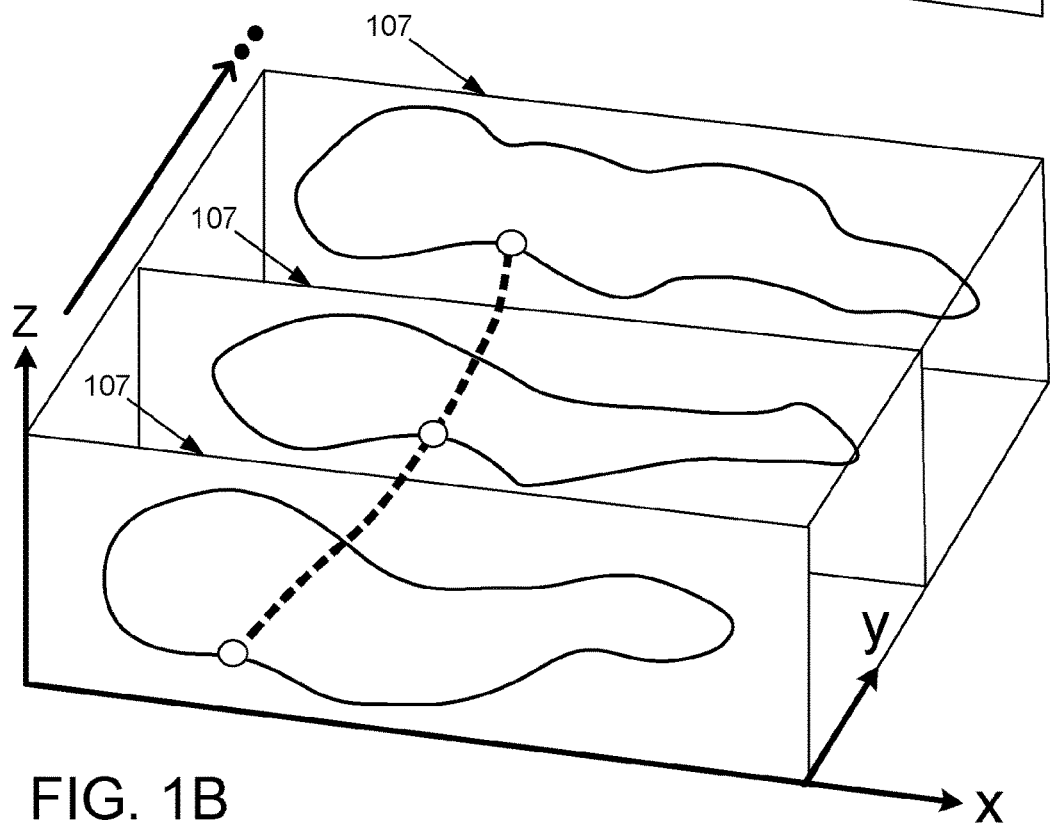
Figure 1C:
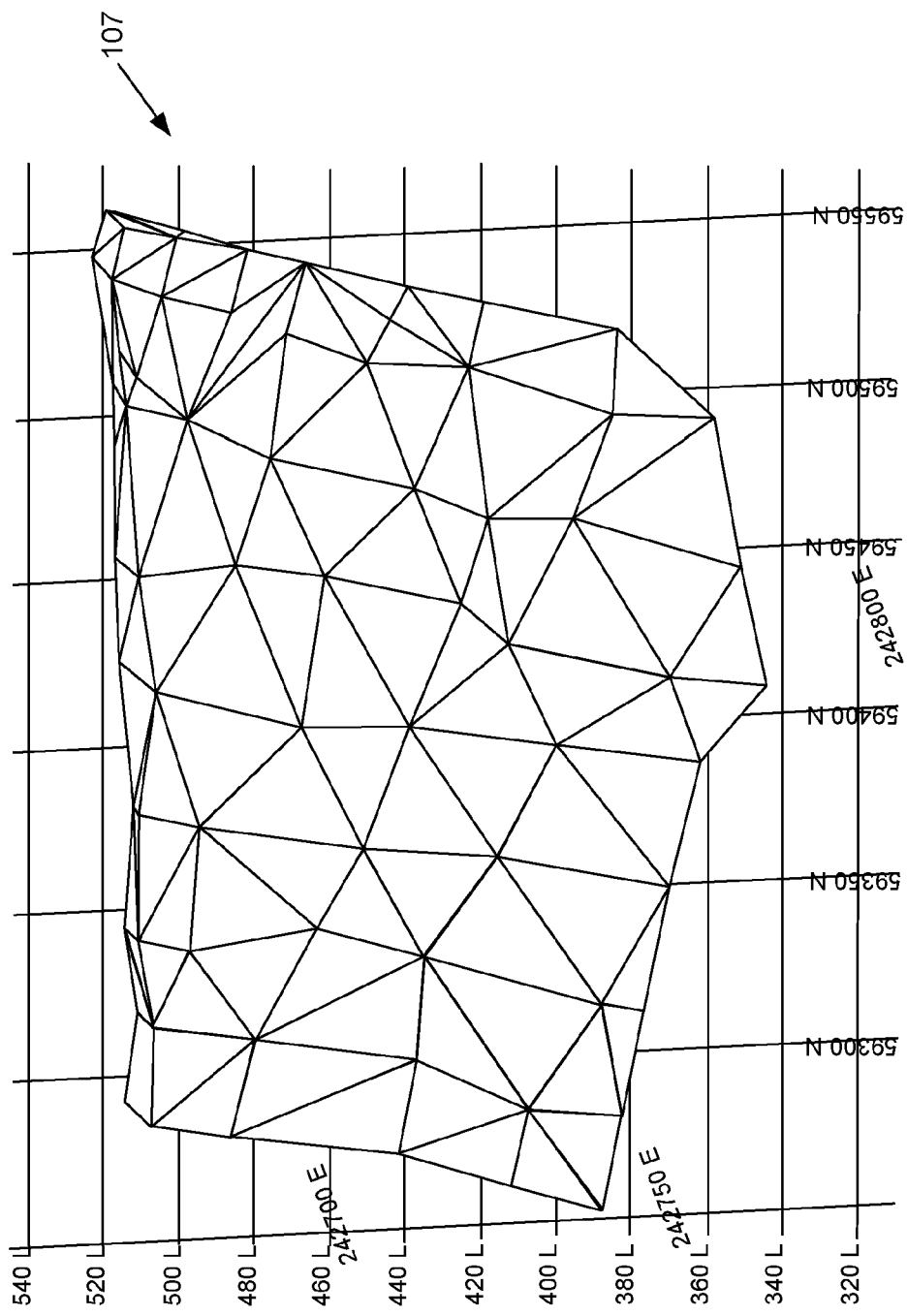
FIG. 1C is a visualization of a triangular mesh visualization, displayed on a computer monitor, of a boundary of resource exploration boundary domain model.

The secondary storage 47 also includes a server-side domain boundary updater software product 40 that is made up of instructions for the processing assembly (which comprises CPU(s) 35) to perform various acts according to a preferred embodiment of the present invention. The processing assembly 35, under control of software product 40 implements a database 42 that is also stored in the secondary storage 47, or in another data storage apparatus at another location accessible to the server, and which contains a model of the geological domains. The model includes x,y,z vertices for representing the domain as a triangulated 3D mesh (for example as illustrated in FIG. 1C) on display 47 or another remote display of a workstation in data communication with server 33. During operation of the server 33 the server processor assembly 35, which is typically comprised of one or more processing cores or discrete processors, loads the operating system 39 and then loads the software 40. The software 40 may be provided in the form of tangible, non-transient, machine readable instructions 59 which are borne by a machine readable media such as a magnetic or optical disk 57.

In use the server 33 is operated by an administrator 67 who is able to log into the server interface remotely across network 31. The administrator is able to monitor activity logs and perform various housekeeping functions from time to time in order to keep the server 33 operating in an optimal fashion.

It will be realized that server 33 is simply one example of a computing environment for executing software 40. Other suitable environments are also possible, for example the software 40 could be executed on a virtual machine in a cloud computing environment.

Figure 5:
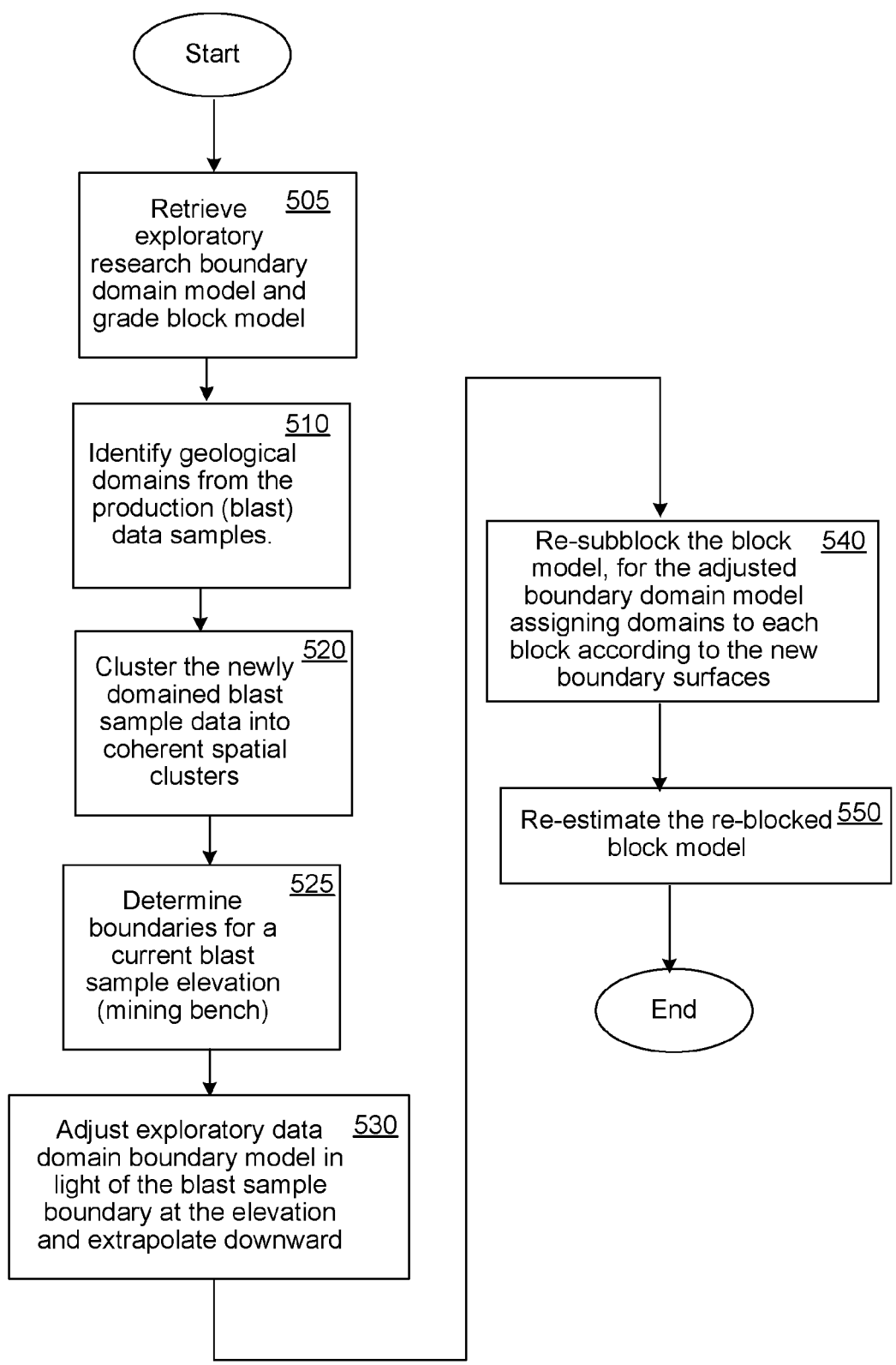
FIG. 5 is a flowchart of procedures that are coded into software executable by one or more processors of the server of FIG. 3 for performance of a method according to a preferred embodiment of the present invention.

FIG. 5 is a flowchart of a method according to a preferred embodiment of the invention which is implemented by server 33 as it executes procedures (or as they are sometimes called "routines" or "functions") made up of instructions comprising the software 40.

Initially, at box 505 the server 33 retrieves an exploratory research boundary domain model from database 42 or another accessible data storage location. An example visual display for an exploratory research boundary domain model has been provided in FIG. 1C. The server 33 also retrieves a corresponding ore grade block model. Both of these models will subsequently be adjusted in light of blast hole sample data as will be explained.

The next step in the exemplary method is box 510. The input to box 510 is a data structure, for example a database table from database 42 containing data for a plurality of blast hole assay samples. The data for each assay sample includes a unique ID, x, y position and set of sample values in the z direction down the hole. The sample values are typically mineral assay values and ratios though other values associated with the samples may also be recorded.

Figure 2A:
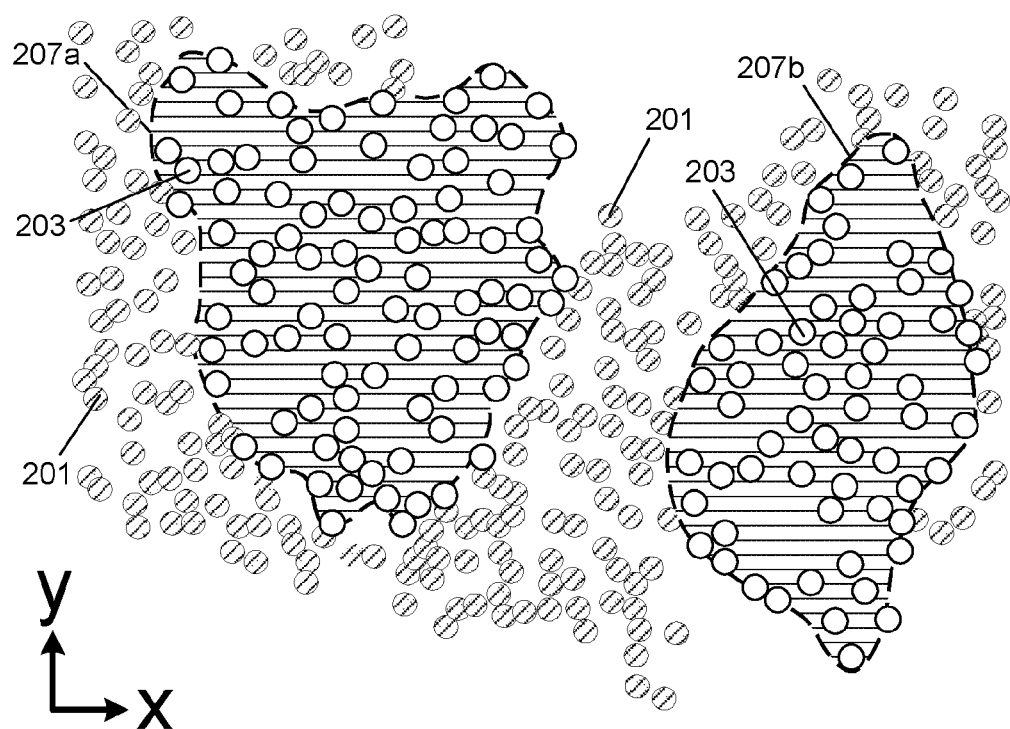
FIG. 2A is a top plan view of a surface of a region being mined showing blast hole sample data points that have been made across the surface at a first elevation or "mining bench".

At box 510 server 33 labels each assay data sample as to whether or not it is associated with a geological domain. The labelling is made on the basis of the sample's assay values so that the samples are labelled as either "domain" or "non-domain" in respect of a domain of interest. For example, the domain of interest may comprise a volume of iron ore. Analysis of the assay values will indicate that some of the samples e.g. samples 201 in FIG. 2A are not associated with an iron ore deposit (i.e. are "non-domain" samples) whilst others, e.g. samples 203 are associated with such a deposit (i.e. are "domain" samples). The samples are labelled accordingly by changing a "label" row in the database table. An alternative approach to detecting boundary samples is to identify blast holes that include sample data from two zones (e.g. "domain" and "non-domain"). However this alternative approach does not tend to work where the dimensions of the domain of interest are substantially greater than the length of the sample drill being used since in that case the sampling may not extend across the domain/non-domain border. As previously discussed the blast hole assay samples are non-uniformly spaced and of low resolution in the Z-axis, thus the procedures that are used for creating boundary models from exploratory drilling samples are inapplicable.

At box 520 the server clusters the domain labelled assay data samples into coherent spatial clusters in order to remove outlier samples which, if they were allowed to remain in the sample set, would distort the boundary to be calculated. There are at least two approaches to performing the clustering, namely MCD based clustering and t-SNE based clustering and both of these methods will be described in more detail shortly. Clustering may cause some of the samples to be re-classified from "domain" to "non-domain" or vice-versa and in that case the server updates the corresponding labels of the affected samples in database 47.

Consequently, at the output of box 520 the database 47 contains data for blast hole assay samples which have been clustered and labelled as either "domain" or "non-domain".

At box 525 the server 33 processes the blast hole assay sample data to identify samples located on a boundary of the domain at the elevation at which the blast hole samples have been taken. A preferred method for boundary detection involves, for each sample, searching to see if that sample is neighbored by similarly labelled samples or not. If the sample under consideration is not surrounded by similarly labelled samples then there is a high likelihood that it is a sample on a boundary so that it comprises a boundary point. Areas of uniformly labelled samples, e.g. all labelled as "domain" or "non-domain" may be said to be "low entropy" areas because they are consistent from the point of view of being all labelled in the same way.

Alternatively, border areas where there are samples of different domain labels in proximity to each other may be said to be "high entropy" regions. By detecting the high entropy regions a horizontal domain boundary at the elevation at which the samples were taken can be determined. For example, in FIG. 2A boundary detection is applied to the blast hole samples 201, 203 which were made at the uppermost elevation (i.e. mining bench) 205. The boundary detection procedure locates two domain boundaries, 207a and 207b at elevation 205. As mining progresses the process is repeated for deeper elevations, 209 and 211 in order to produce a series of contours that represent boundaries for each elevation.

More details of this method for blast hole sample boundary detection at a given elevation will be described later in this specification.

Consequently, the output from box 525 comprises blast hole sample domain boundaries at each elevation. The boundaries are made up of sequences of XYZ points, where the Z point is substantially constant for each elevation.

At box 530 vertices of the exploratory data domain model, which was retrieved at box 505 and an example of which has been visually represented in FIG. 1C, are adjusted in light of the blast hole sample boundaries output from box 532. The adjustment is done using a "surface warping" procedure. The surface warping procedure involves creating a field of error vectors which correspond to displacement vectors between the vertices of the exploratory surface boundary and the closest corresponding boundary points at the same elevation for the blast hole data. The error displacement can be extrapolated to surrounding regions on the assumption that the error displacement is a smoothly varying function. More information about the surface warping procedure is provided in a subsequent section of this specification. The exploratory data domain boundary model is updated by adjusting its triangulation mesh vertices to minimize error between the exploratory domain boundary and the blast hole boundary sample points.

Figure 2B:
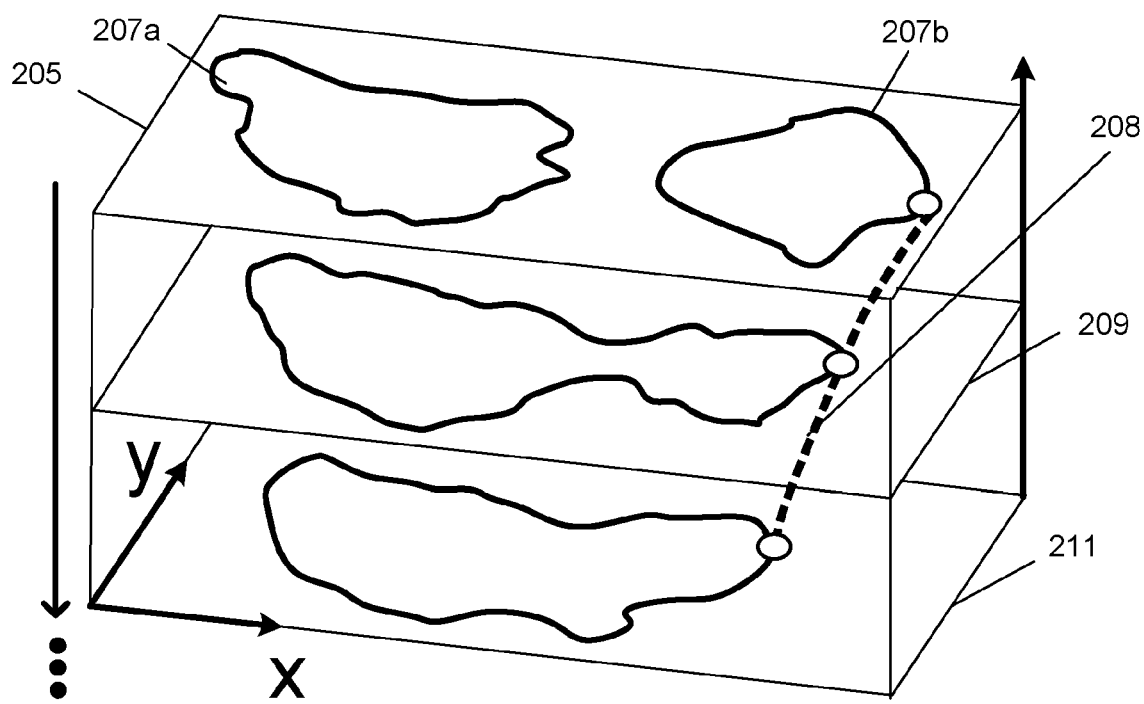
FIG. 2B illustrates domain boundaries at three different elevations that have been determined from blast hole sample data points made at each of the three elevations or mining benches wherein the uppermost elevation corresponds to the plan view of FIG. 2A.

The underlying assumption in the surface warping procedure is that the basic exploratory data domain boundary model is reasonably good on a resource evaluation scale but that the precise position and/or shape of features that it models is inexact at the local/mining scale. On the basis of that assumption the error-displacement is believed to vary only a small amount from one position to any other nearby position. This then provides a useful way to extrapolate domain updates from one position (at the location of the assayed blast hole samples at a first elevation) to a nearby position (i.e. within a region yet to be drilled and sampled, such as the next mining bench, which is the next elevation down in FIG. 2B). Extrapolation in this manner enables an improvement in the boundary modelling even where no data has been collected so that the adjusted research domain boundary model is progressively improved.

Consequently, the output from box 530 is an updated version of the resource exploration domain boundary model, stored in database 47, which has been revised to take into account blast hole sample data from the most recent mining bench with extrapolation toward a lower bench (elevation) that is yet to be blast hole sampled. The vertices of the triangulation mesh that is used to visually display the boundary are adjusted to minimize error relative to the blast sample boundary points.

It will be realized that the adjusted domain boundary model that results from the processing in box 530 will have some different shapes and features compared to the original, unadjusted exploratory domain model. Consequently, the original ore grade block model, which was based on the unadjusted model will no longer be accurate. Therefore, at box 540 the block model structure is revised and each block is assigned a new domain label according to the new, adjusted boundary surfaces.

At box 550 the blocks of the new block model are processed to re-estimate the grade values for each block. Consequently the accuracy of the block model is improved as the blast hole sample data is used to reduce errors.

The implementation details for the steps that are carried out in a number of the boxes of the flowchart of FIG. 5 will now be discussed.

Box 520—Cluster the Newly Domained Blast Sampled Data Using t-Distributed Stochastic Neighbor Embedding (t-SNE)

As previously discussed, at box 520 clustering of the blast hole data samples is performed to discard outliers and increase the likelihood of samples being correctly identified and labelled as "domain" or "non-domain". Identification and separate treatment of subdomain regions (located within the exploration-based domains) has the potential to significantly increase the robustness of the models and improve their reconciliation with the production outcomes. Recent study by Balamurali and Melkumyan (2016) applied t-SNE introduced by Maaten and Hinton in 2008 with geochemical assay data and showed that application of t-SNE can be used to visualise the clusters, i.e. different geological domains, in reduced dimensions. The experimental results of this study demonstrate that t-SNE is very flexible, and can find structure where other dimensionality-reduction algorithms fail.

Further, spectral clustering can be applied to the t-SNE coordinates to extract cluster labels.

In one embodiment of the present invention t-SNE is used at box 520 incorporating a spectral clustering algorithm to identify samples that have been incorrectly labelled as waste samples ("non-domain") or which have been incorrectly labelled as being included in the mineral domain (i.e. "domain" samples). Automatic identification of subdomains which are latently present in the existing domains is also provided for. This means that sub-domains which were not detected in the original exploratory drilling domain boundary model may be identified from the blast data samples using the t-SNE based method. In a preferred embodiment of the invention results from multiple t-SNE runs are fused to implement ensemble clustering. The Inventors have found that the application of the t-SNE based approach incorporating spectral clustering method shows statistically significant deviations in the identified latent subdomain from the existing domains within which they are identified.

Figure 6:
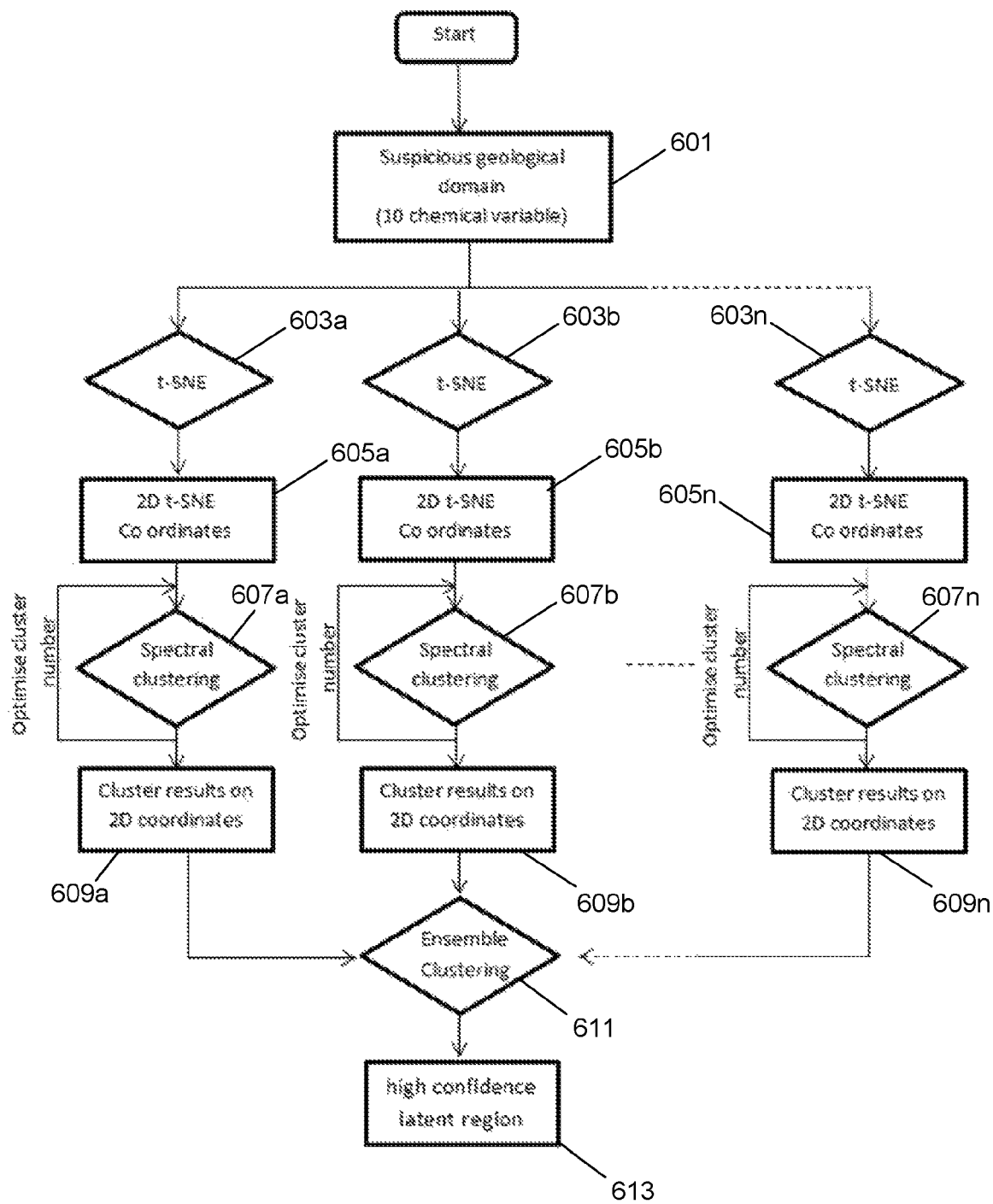
FIG. 6 is a flowchart of a first clustering method, being a t-SNE based method that is used in one embodiment of the method of FIG. 5.

A workflow for the proposed methodology of automatic detection of latent sub-domains using t-SNE incorporating cluster ensemble is set out in FIG. 6. The input for the system, box 601 is an existing geological domain model for the region in which the blast hole drilling is occurring that is suspected to consist of a latent sub region.

At boxes 603a, . . . ,603n unsupervised dimensionality reduction technique t-distributed Stochastic Embedding (t-SNE) is applied on geochemical assay of both production and drill hole data of the input which, in an exemplary case initially consists of ten chemical species. The final results are projected on their two dimensional reduced features (t-SNE coordinates) boxes 605a, . . . , 605n. The parameters were chosen from the previous study by Balamurali, (2016) such that the values for initial dimensions are set to ten as there are ten geochemical species used in this study and the perplexity of the Gaussian kernel that is employed is set to the default value 30. As used in Balamurali, (2016) a normalized spectral clustering algorithm defined on the k-nearest neighbour similarity graph was then applied (boxes 607a, . . . , 607n) to the t-SNE coordinates to extract cluster results, i.e. cluster labels, at boxes 609a, . . . , 609b where k is 20.

A challenging part of applying t-SNE incorporating clustering is that the method results in highly distinguishable different clusters, at boxes 609a, . . . , 609n at different runs (epochs). These multiple results are then optimized using ensemble clustering at box 611 to obtain a final set of clustered samples at box 613 that define a high confidence latent sub region.

By saving the initial solutions at each run the results can be reproducible if required.

Theory of the Algorithms t-SNE (Boxes 603a, . . . , 603n of FIG. 6)

As proposed by Maaten and Hinton in 2008, given a high dimensional data set $[X_1, \ldots, X_N]$ of N instances, the aim is to calculate the probabilities $p_{i,j}$ as follows:

$$p_{j|i} = \frac{\exp(-\|X_i - X_j\|^2/2\sigma_i^2)}{\sum_{k \neq i} \exp(-\|X_i - X_k\|^2/2\sigma_i^2)} \quad (1)$$

$$p_{i,j} = \frac{p_{j|i} + p_{i|j}}{2N} \quad (2)$$

Where $p_{i,j}$ is corresponding to the similarity of the instances $X_i$ and $X_j$ and $\sigma_i$ is the bandwidth of the Gaussian kernel which is adjusted to the density of the data.

Similarly, t-SNE computes $q_{i,j}$ which is the similarity between instances $y_i$ and $y_j$ in the reduced d-dimensional map of data $Y_1, \ldots, Y_N$ ($Y_i \in \mathbb{R}^d$) as below:

$$q_{i,j} = \frac{(1 + \|y_i - y_j\|^2)^{-1}}{\sum_{k \neq i}(1 + \|y_k - y_j\|^2)^{-1}} \quad (3)$$

Optimal position for the instance $y_i$ in the reduced map is obtained by minimizing the (non-symmetric) Kullback-Leibler divergence of the distribution Q from the distribution P, that is:

$$KL(P\|Q) = \sum_{i \neq j} p_{ij} \log \frac{p_{ij}}{q_{ij}} \quad (4)$$

where P and Q are the entire set of $p_{i,j}$ and $q_{i,j}$ respectively. The minimum value for KL is computed using the Gradient descent.

Spectral Clustering (Boxes 607a, . . . , 607n of FIG. 6)

The basic idea of spectral clustering (Luxburg, U. (2007)) is to project the data into $R^n$ and define an Affinity matrix A, using a Gaussian Kernel. The Graph Laplacian from A (i.e. decide on a normalization) is used to solve an Eigenvalue problem, such that $Lv = \lambda v$ (or a Generalized Eigenvalue problem $Lv = \lambda Dv$. The number of k eigenvectors $\{v_i, i=1,k\}$ are corresponding to the k lowest (or highest) Eigenvalues $\{\lambda_i, i=1,k\}$, which defines a k-dimensional subspace P'LP. The k-means is used to form clusters in this subspace.

Optimize Cluster Number

The cluster method according to the present embodiment allows, rather than specifying a single cluster number, the specifying of a range for k number of cluster for each t-SNE map. The "best" choice, with respect to the measure of how close each point in one cluster is to points in the neighbouring clusters, in the range will be part of the output base cluster for each corresponding t-SNE map.

Cluster Ensemble (Box 611 of FIG. 6)

The cluster ensemble procedure combines results from multiple base clusters (boxes 609a, . . . , 609n), which are obtained on different t-SNE maps incorporating the spectral clustering method, into the final result. Optimal combined clustering will include the most information with the original clustering of base clustering. The cluster ensemble method used in the present embodiment follows the following steps:

Step 1: build an N×N dimension consensus matrix using base clusters which is the similarity measure between a pair of data points. The measure is the ratio between a number of clusters that two data points belong to and the total number of clusters in the ensemble. See S. Monti, P. Tamayo, J. Mesirov, and T. Golub, "Consensus clustering: a resampling-based method for class discovery and visualization of gene expression microarray data," Machine learning, vol. 52, no. 1, pp. 91-118, 2003.

Step 2: run a hierarchical agglomerative algorithm on the consensus similarity matrix (Nguyen et al. (2007)).

In order to obtain the best results from the t-SNE technique that has been described it has been found that it is important to perform the following:

Data normalisation (standardising variables+importance weights)

Cluster number optimisation (measure consistency of samples within clusters using a silhouette score (See P. J. Rousseeuw, "Silhouettes: a graphical aid to the interpretation and validation of cluster analysis," Journal of computational and applied mathematics, vol. 20, pp. 53-65, 1987.))

Ensemble clustering ("averaging out" random noise to uncover persistent clustering patterns)

Multiple linkage criteria in agglomerative clustering when one measure fails to respond to differences.

A pseudocode for implementing a t-SNE method for clustering at box 520 of FIG. 5 that also includes silhouetting and spatial visualisation of clusters is as follows:

Method 1: t-SNE and Spectral Clustering with Ensemble Clustering and Silhouette Measure:

1: for domains do
2: —normalise chemistry data→ξ
3: for each random run do
4: —compute t-SNE(ξ)→tsne. (Note: The output tsne is a set of feature vectors in embedded space (usually, 2D or 3D))
5: —cluster number optimisation(ξ, tsne)→($v_x$, silhouette_scores)
6: —spectral clustering(tsne, $v_x$)→cluster labels
7: —update affinity matrix, A
8: —make plots (e.g. boxplot, silhouette, spatial, visualization of clusters etc)
9: end for
10: —ensemble clustering→persistent clusters (replacing cluster labels)
11: —make plots (e.g. boxplot, silhouette, spatial, visualization of clusters etc)
12: end for
13: return cluster labels, silhouette scores Ensemble clustering (agglomerative clustering) may return fewer clusters than the specified number $v_x$ if the data is self-consistent, or the similarity measure (e.g., min-linkage) is significantly impacted by outliers.

As a precaution, auxiliary measures (Ward and average-linkage) may be used (evaluated conditionally) to ensure an alien cluster is not missed just because it has a few isolated points sufficiently similar to the main population.

It should be understood that cluster number optimisation implies choosing the target number of clusters with the highest Silhouette score with the intent to select the fittest outcome. For a given t-SNE run $v_x$ may be fixed if it is not optimised.

Box 520—Cluster the Newly Domained Blast Sampled Data Using Minimum Covariance Determinant (MCD)

In the previous section a method, which server 33 is programmed to implement in one embodiment of the present invention, has been described that uses t-SNE clustering to cluster the blast hole assay samples. As previously discussed, the reason why clustering is preferred is to discard outlier blast hole assay samples and thus increase the likelihood of samples being correctly identified and labelled as "domain" or "non-domain". An alternative approach to clustering that the server 33 may be programmed to implement in another embodiment of the invention will now be discussed, which is based on the use of a Minimum Covariance Determinant (MCD) procedure.

Background Theory (MCD)

Multivariate Outlier Detection:

Consider a data set D with p features and n instances. In a supervised classification context the classes where each of the instances belongs to, must also be known. The objective is to detect all the instances that seems to be unusual, these will be the multivariate outliers. One might think that multivariate outliers can be detected based on the univariate outliers on each feature but this is not true. On the other hand, an instance can have values that are outliers in several features but the whole instance might be not a multivariate outlier.

Classical Mahalanobis Distance

Let x be an observation of a multivariate data set consisting of n observations and p features. Let X be the centroid of the dataset, which is a p-dimensional vector with the means of each feature as components. Let X be the matrix of the original dataset with columns centered by their means. Then the p×p matrix $S=1/(n-1) X'X$ represents the covariance matrix of the p features. Then the classical Mahalanobis distance of multivariate outlier detection is:

$$D^2(x,\bar{x}) = (x-\bar{x})S^{-1}(x-\bar{x}) > k \quad (1)$$

where $D^2$ is called the Mahalanobis square distance from x to the centroid of the dataset. An observation with a large Mahalanobis distance can be considered as an outlier. Assuming that the data follows a multivariate normal distribution then it has been shown that the distribution of the Mahalanobis distance behaves as a Chi-Square distribution for a large number of instances (Garrett, 1989). Therefore the proposed cutoff point is given by $k=\chi^{2(p,1-\alpha)}$, where $\chi^2$ stands for the Chi-Square distribution and a is a signification level usually taken as 0.025 (Rousseeuw, 1999).

Minimum Covariance Determinant

The Minimum Covariance Determinant (MCD) estimator is the centre and the covariance of a subsample of size h (h≤n) that minimizes the determinant of the covariance matrix associated to the subsample. Formally, $$MCD = (\bar{x}_J^*, S_J^*) \quad (2)$$

where J={set of h instances: $|S_J^*| \leq |S_K^*|$ for all K s.t. #(K)=h}.

As before, it is common to take $h=[(n+p+1)/2]$, where [·] is the greatest integer function.

Replacing the classical estimators of the centre and the covariance in the usual Mahalanobis distance, equation (1), by MCD estimator, outlying instances will not skew the estimates and can be identified as outliers by large values of the Mahalanobis distance. The most common cut off point k is again the one based on a Chi-Square distribution. A chi-squared Q-Q plot is one useful way to visually assess whether the distance is distributed as $\chi^2_p$.

Example of Use of MCD Clustering

Figure 7:
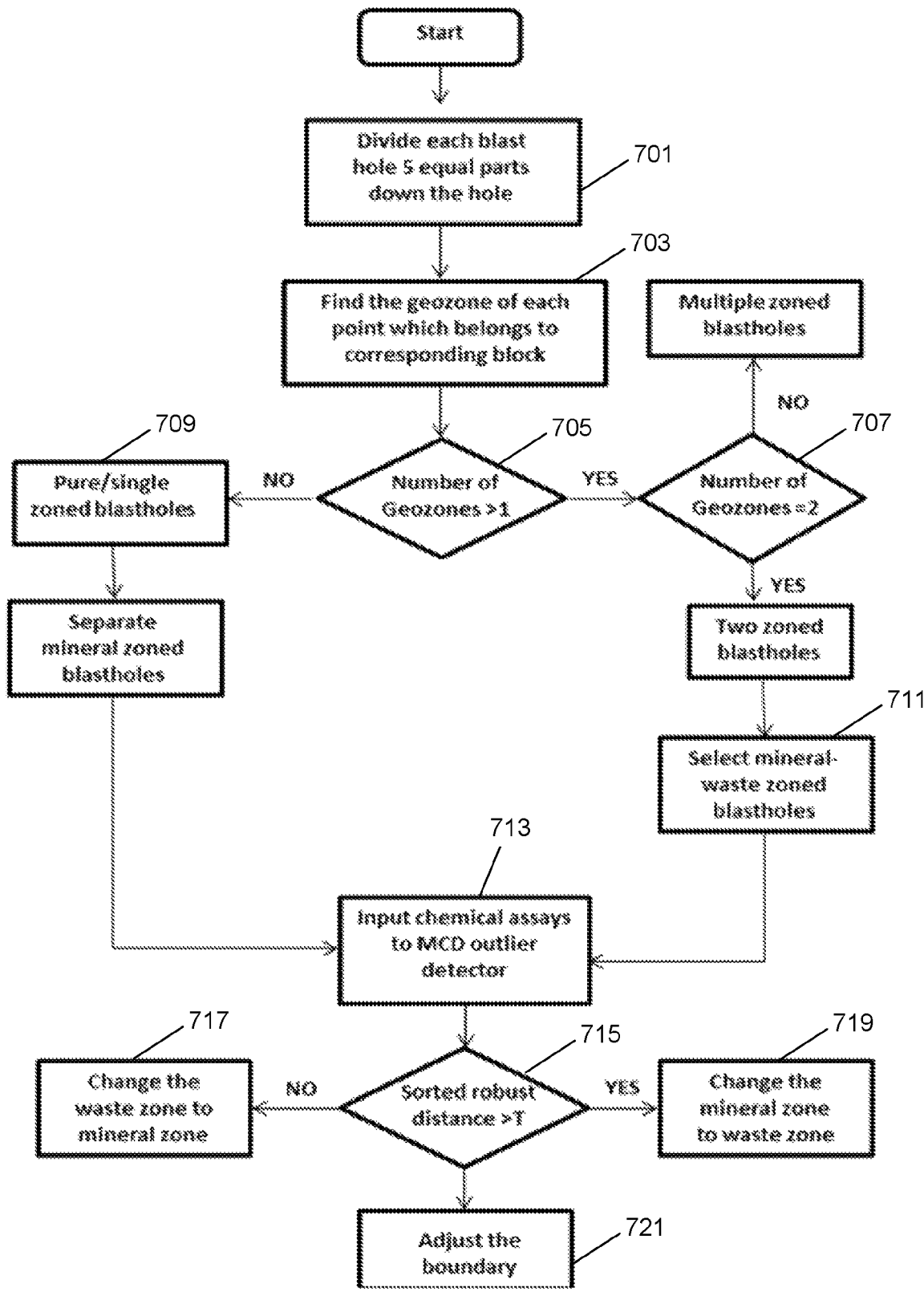
FIG. 7 is a flowchart of a second clustering method, being a MCD-based method that is used in a second embodiment of the method of FIG. 5.

FIG. 7 is a flowchart for a method of adjusting a block model boundary in light of blast hole assay data samples using the MCD method. In one example, the proposed method used both block model data and the production data (blasthole data). The production data consists of 42734 measurements of mineralised, waste and hydrated data. The holes are generally 5 m apart and tens to hundreds of meters deep. The measurements include the position (east, north, elevation) data along with the ten variables of interest: iron (Fe), silica ($SiO_2$), alumina ($Al_2O_3$), phosphorus (P), manganese (Mn), loss on ignition (LOI), sulphur (S), titanium oxide ($TiO_2$), calcium oxide (CaO) and magnesium oxide (MgO). As previously discussed, production assay data, i.e. blast hole assay sample data, is sparse in the vertical direction and does not have pre assigned domain/non-domain labels.

The block data of the present example consists of 8389214 measurements of mineralised, waste and hydrated data. The measurements include the position (east, north, elevation) and the size of each dimension along with the ten chemical species of interest and the corresponding geological domains.

Assign geological domain labels to production data using Block model: Geological domain labels of block data are used to identify the domains for blast holes (production data). With reference to FIG. 7, in order to identify the domains for each blast hole, each blast hole was further divided (box 701) into five equal intervals down the hole. Each coordinate point in the blast hole was identified as belonging to a corresponding block and then a domain (which is referred to sometimes herein as a "geozone") label was assigned to those points corresponding to each block geological domain (box 703). As the boundary of interest is the boundary between mineral and waste domains, production data with waste and mineral regions were separated from the entire data. These blasthole data (production data) with domain labels were further grouped (boxes 705, 707) into single hole (709) with pure mineral regions (SHM), single hole with pure waste regions (SHW) and single hole with mineral and waste regions (SHMW) (box 711). The single hole with mineral and waste (SHMW) data are of interest.

Reassign Geological Domain Data to Production Data Using MCD:

Once the initial domains of blast holes were known, chemical assays were used to identify the exact geological domains for ambiguous SHMW data (box 713). MCD robust outlier detection method was applied to the mixture of SHM and SHMW with ten geological variables and the ratios of some chemical as mentioned in Balamurali et al (2015) and then the data were split into waste and mineral regions. The production data was identified as waste when the sorted robust distance was greater than the threshold value (box 715), because they are outlier samples of mineral assay. The correlation coefficient between the chemical species was then compared with mineral samples after excluding the outlier sample (Table 1).

TABLE 1

Correlations between chemical species.

| | Blasthole with Domain labels A and B (SHMW) | Blasthole with updated Domain label A (SHM) |
|---|---|---|
| Fe and $Al_2O_3$ | −0.53 | −0.82 |
| Fe and $SiO_2$ | −0.92 | −0.87 |
| $SiO_2$ and $Al_2O_3$ | 0.15 | 0.50 |

As shown in the flowchart of FIG. 7, firstly spatial information and the Block domain labels were used to identify domain labels for the blasthole data. Out of 42734 production data 3031 data samples were found to belong to a single block zone of mineralised domain A and thus were categorised as SHM. 255 of the single blast hole data samples were found to belong to both mineralised domain A and waste geo zone B and were therefore categorised as SHMW. Once the domains of the blast holes were known, the blast hole chemical assays were considered (713). The MCD outlier detection method was then used to identify the exact geological domains for the blast holes which are spatially located between multiple geological regions (boxes 717, 719). Thus, it was used to update the surface through mineral-waste contacts.

When MCD is used to update the domain labels the correlations between species improves as shown in Table 1. The high grade ore contains mostly iron oxides with some shale. In contrast, the shale contains abundant SiO2 and Al2O3 and less iron than surrounding ore. Due to this, the SiO2 and the Al2O3 have increasing positive correlation with each other and previous studies in the literature have established that they both have a negative correlation with iron.

Figure 8A:
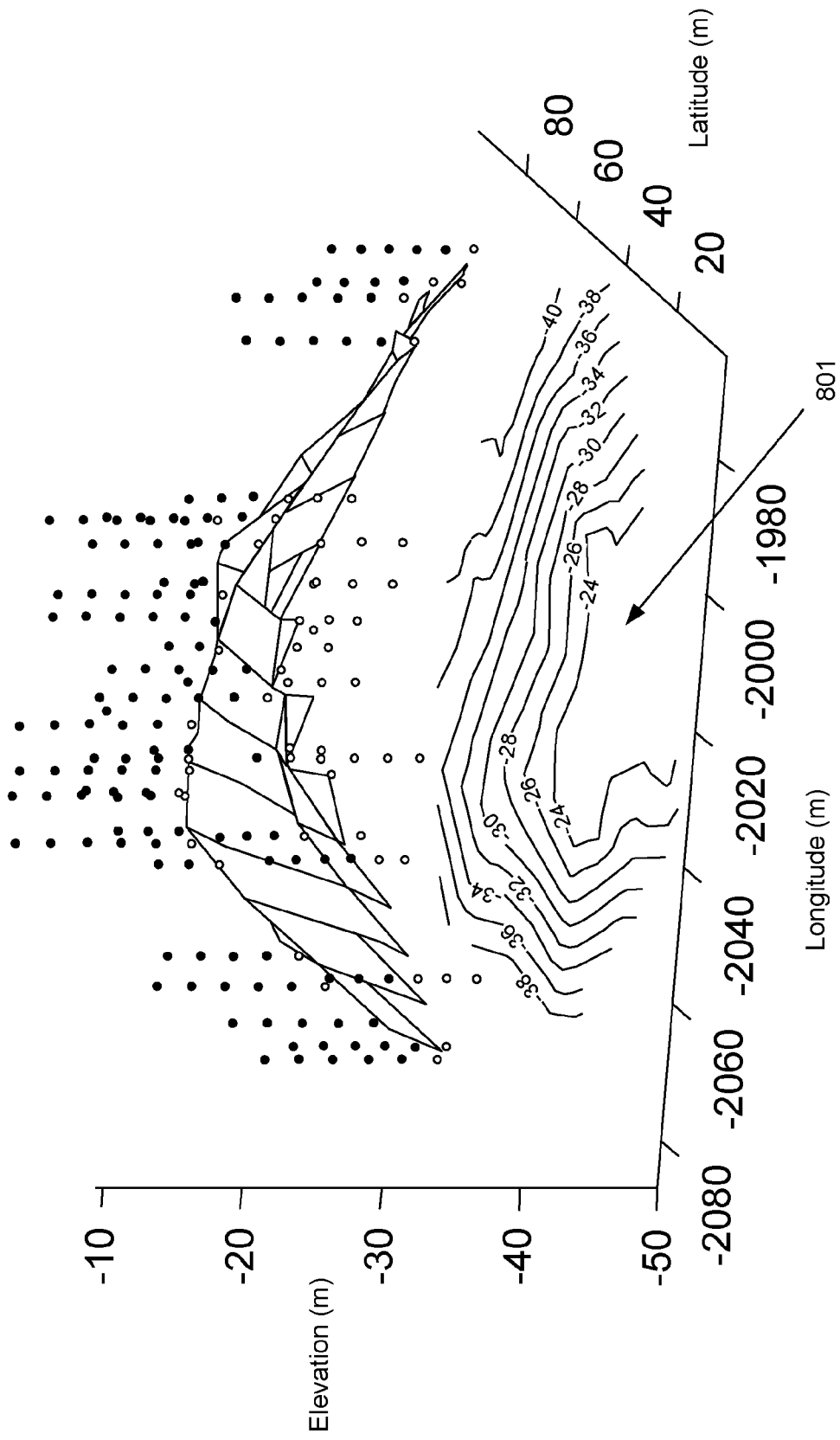
FIG. 8A Is a first graph of the surface of a geological domain boundary generated using initial surface data.

FIGS. 8A-8D illustrate example blast holes SHMW showing how the surface changes when the domains are reapplied after processing with MCD outlier method (FIG. 8A—Initial surface, FIG. 8C—surface with updated domain). The dots and rings on each vertical line represent the elevation points at each blast hole and the block they belong to (Solid dots—mineral domain A blocks and rings—waste domain B blocks). Contour lines 801, 803 show the depth of the surface goes through the mineral-waste interface (801—Initial surface contour, 803—surface contour with updated domain). The labels on contour lines show the elevation of mineral and waste contact point.

The example FIG. 8A shows the initial domain labels assigned to the six different elevation points at each blast-hole data using the corresponding block's domain. Solid dots and rings show the domain of mineral (domain A) and waste domains (domain B) respectively. FIG. 8A clearly shows the blast holes which belong to multiple geological regions (single hole with mineral and waste (SHMW)). Countours 801 reflect the contours of the surface which pass through the mineral waste boundary of sample.

Figure 8B:
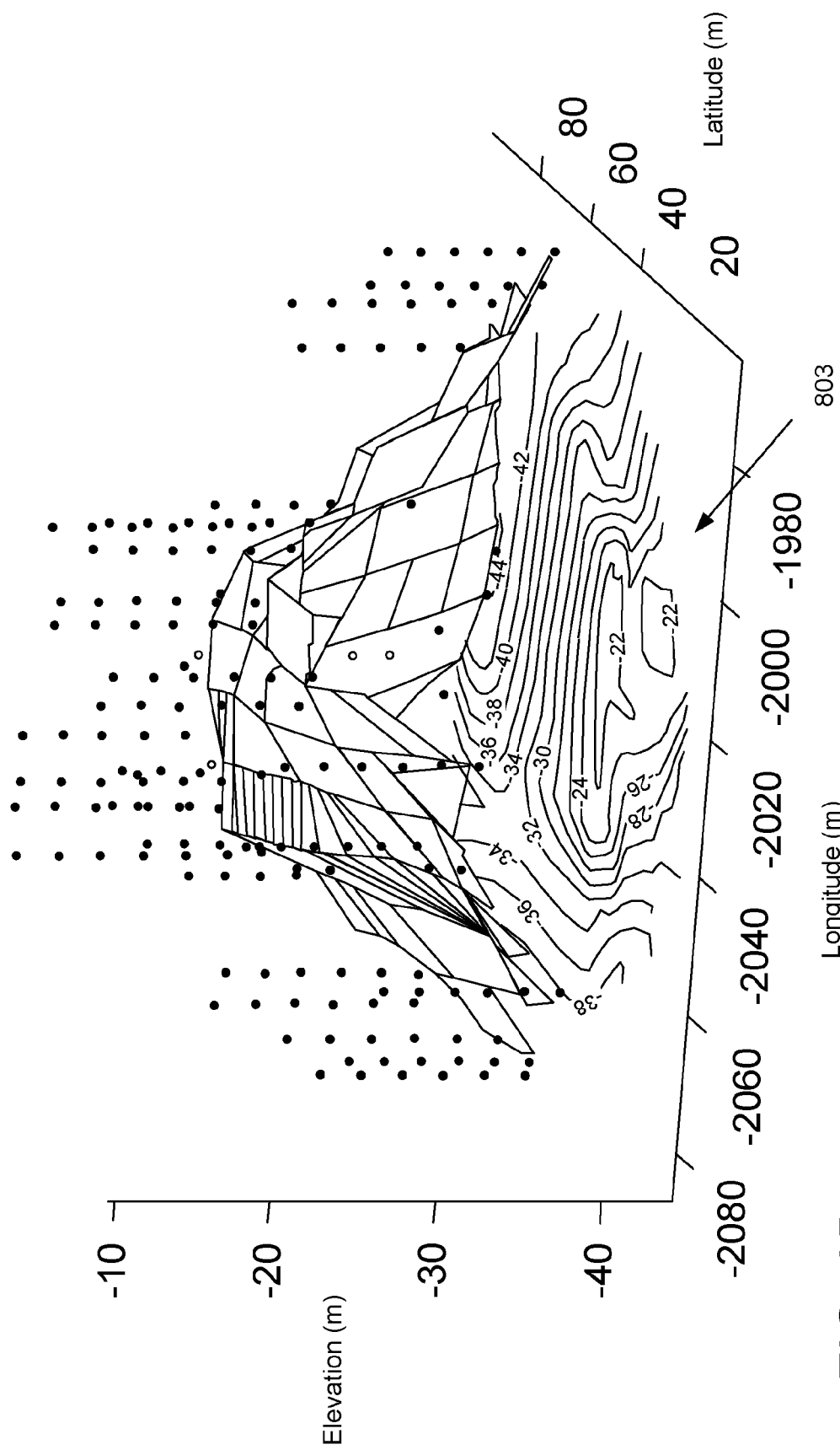
FIG. 8B Is a second graph of the surface of the geological domain boundary generated with a domain boundary updated by application of an MCD outlier method.
Figure 9:
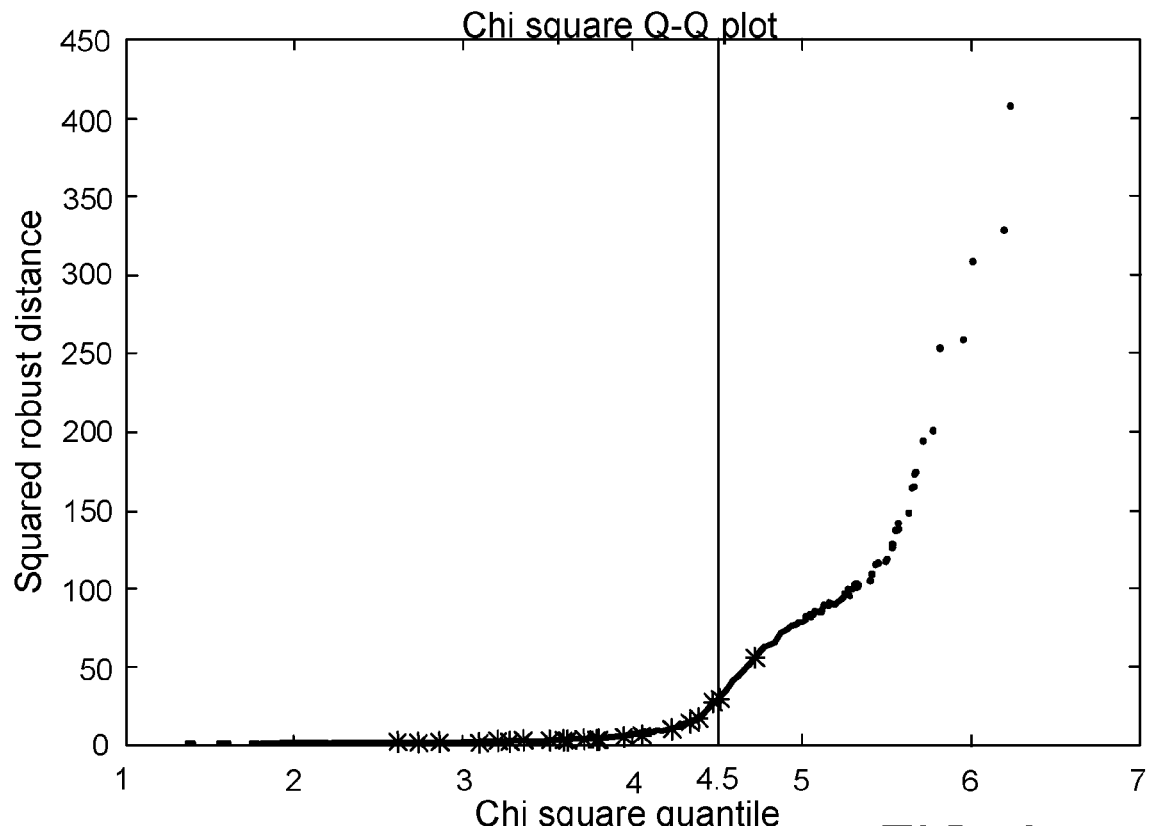
FIG. 9 is a first Quartile-Quartile plot of robust distance vs sqrt of Chi squared quartiles for identifying outliers using an MCD-based clustering method according to an embodiment of the method of FIG. 5.

As discussed in Balamurali et. al 2015, the map of the multivariate outliers and their identification is important for separate waste points or anomaly regions from homogeneous mineral domains. After applying robust procedures the outliers are actually left in the data set. Working in this way permits the outliers to be viewed in the context of the main mass of the data, which facilitates an appreciation of their relationship to the core data. In FIG. 9 there are two blast hole sample SHMW (red '*' shows the SHMW data and blue '.' show the SHM) are identified as outliers, i.e. the robust distance greater than proposed cut-off point given by $\chi^2(13, 0.90)$, and the rest are identified as pure mineral region. As a result the domain labels are reassigned to the blast holes with ambiguous geological domain such that the blast holes carry one geological domain label per hole, i.e. domain A or domain B. As shown in FIG. 9, these newly identified domain labels can then be used to update mineral waste boundaries. FIG. 8B shows the updated geo zone labels and contours 803 of the new boundary.

As can be observed in the geological structure the mineral domain always follows the waste domain in the downward direction. So the updated mineral hole pushes the surface downwards from its initial point and the updated waste hole pushes the surface upward. From the changes between contours 801 and 803 it is evident that there is a significant difference between the contour lines which represent the mineral-waste boundaries before and after the MCD method was applied.

It will therefore be realised that the MCD method according to an embodiment of the invention that has been described is able to identify geological domains for the blast hole data using the block model and then by using the minimum covariance determinant (MCD) to update domain labels for the blast holes with multiple region into single geological domain. Thus, it was used to update the surface through mineral-waste contacts. It will be understood from the previous discussion that there is significant difference in the mineral waste contact boundaries and the correlation between main chemical species.

Chemical assays from drill-hole samples are used to identify the exact location of the boundary. However, this is not adequate from a mining perspective. The estimated ore control model block grades are then used in turn to design surface polygons or dig lines that outline and separate various ore types and waste material for the purposes of mining. As the initial boundary is created by horizontally sparse drill-hole data, our method proposed a frame work for using blast holes which are spatially dense in the horizontal plan. Thus, it can be used to verify the accuracy of boundary by comparing the block boundaries.

It will therefore be realised that in one embodiment of the invention there is provided a method using MCD (Minimum Covariance Discriminant) for removing outliers (i.e., retaining representative samples) in a given geological domain to minimise the impact of outliers on the covariance estimate E.

The MCD method operates on the assumption that the assay distributions are multivariate Gaussian so that given enough samples, the squared robust distance, $d^2$robust, will follow a $\chi^2$ distribution. Hence, a Q-Q plot of the sorted robust distances ($d^-_{robust}$) vs the $^P\chi^2$ quantiles ($x^-\chi_v$) can effectively isolate the most extreme outliers, relegating them to the tail as illustrated in FIG. 10.

Figure 10:
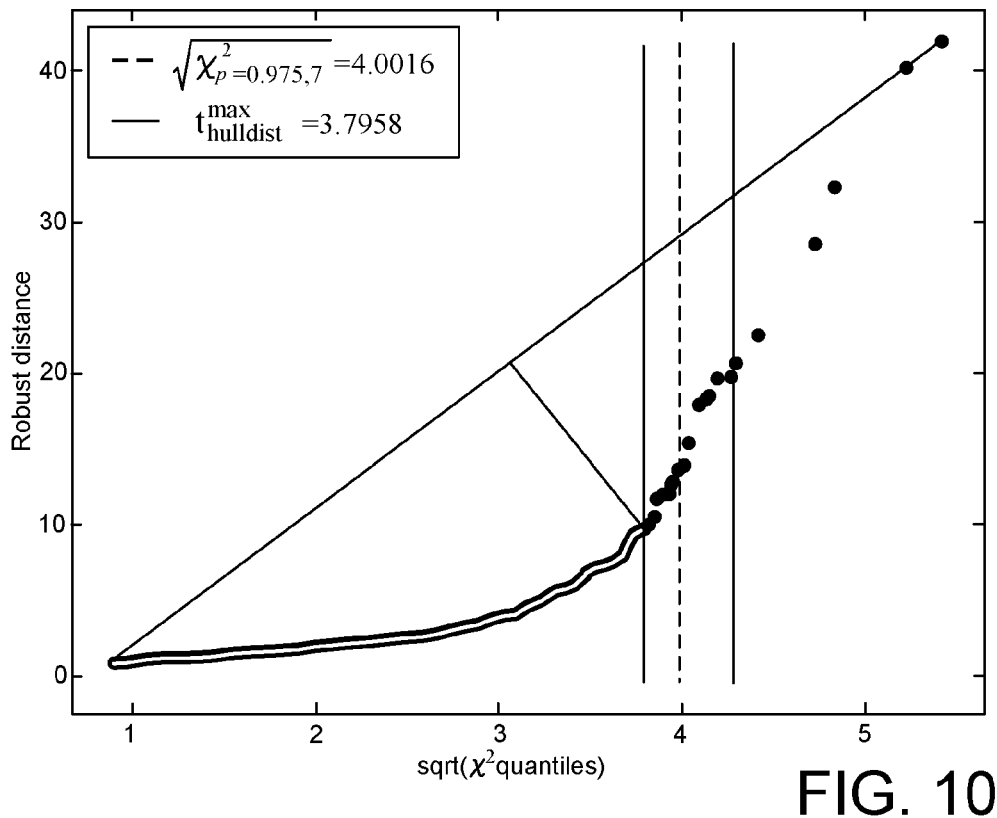
FIG. 10 is a second Quartile-Quartile plot of robust distance vs sqrt of Chi squared quartiles with a hull distance vertical reference line superimposed thereon.

FIG. 10 is a Quartile-Quartile plot of robust distance ($d^-_{robust}$) vs sqrt of $\chi^2$ quantiles ($x^-\chi_v$).

Outliers may be identified as those (red) samples with a $\chi^2$ value exceeding some threshold, say, $\chi^2_{p,v}$ (where $p=1-\alpha$ and the significance level $\alpha=0.025$). Alternatively, the knee of the curve may be used to specify a threshold, This may be computed using a 'max-hull' distance.

The procedure that is implemented in MCD outlier detection box 713 of FIG. 7 may be expressed in pseudo code as follows:

1: for each geozone do
2: form feature vectors (single elements, plus ratios between species)
  e.g. $f=[Fe, SiO_2, Al_2O_3, LOI, P, \ldots, Al_2O_3/SiO_2, LOI/Al_2O_3, TiO_2/Fe]$, $f \in \mathbb{R}^{n_{Observ} \times n_{Features}}$
3: specify the support fraction $\eta<1$ and number of samples used in raw MCD estimates, h.
  setting $h=\max\{(n_{Observ}+n_{Features}+1)/2, \eta \cdot n_{Observ}\}$, the estimator tolerates up to $(n_{Observ}-n_{Features}-1)/2$ outliers when $\eta \cdot n_{Observ} < (n_{Observ}+n_{Features}+1)/2$
4: compute chi square critical values
  $\chi_{p,v}^2$ for $p=1-\alpha$ and $\alpha=[0.0125, 0.025, 0.05]$ for conservative, standard and bold stance: $v=n_{Features}$
5: perform robust covariance estimation (Rousseeuw, 1985)
  $d_{robust}, \pi \leftarrow$ ComputeMCDRobustDistance(f, h, random_seed),
  note: $\pi$ sorts samples in $d_{robust} \in \mathbb{R}^{n_{Observ}}$ in descending order to produce $\tilde{d}_{robust}=\pi(d_{robust}) \in \mathbb{R}^{n_{Observ}}$
6: generate chi squared quantiles to accompany $\tilde{d}_{robust}$
  $x_{\chi_v} \in \mathbb{R}^{n_{Observ}} \leftarrow \sqrt{\chi_v^2 \text{rand}(\cdot)}$ and let $\tilde{x}_{\chi_v} = \text{sort}(x_{\chi_v}, \text{descending})$,
7: execute baseline outlier detection strategy using $\sqrt{\chi_{p,v}^2}$
  find truncation points $i_{chi2}^{(p)} = \max_n \{n | \tilde{x}_{\chi_v}[i] > \sqrt{\chi_{p,v}^2} \, \forall i \leq n\}$ for $p=[0.9875, 0.975, 0.95]$
  note: outliers lie in interval $[0, i_{chi2}^{(p)}]$ with respect to the sorted sequence $\tilde{d}_{robust}$.

8: if attempt max-hull or max-silhouette strategy then
9: execute maximum hull distance outlier detection strategy ($\xi$IV-A)
  find truncation point $i_{hd}^{max}$ and hull distances $r_{hd} \in \mathbb{R}^{nObserv}$ using $\tilde{d}_{robust}$, $\tilde{x}_{\chi v}$, and $i_{chi2}^{(p)}$
10: if attempt max-silhouette strategy then
11: execute maximum silhouette local-search outlier detection strategy ($\xi$IV-B)
  find truncation point $i_{max}^{silhouette}$ using $\pi(f)$, $\tilde{x}_{\chi v}$, $i_{chi2}^{(conservative)}$, $i_{chi2}^{(bold)}$, $i_{hd}^{max}$ and $r_{hd}$
12: end if
13: end if
14: set $i_{cutoff}$ to $i_{silhouette}^{max}$, $i_{hd}^{max}$ or $i_{chi2}^{(standard)}$ [in this order of preference] depending on the strategy used.
15: apply threshold function and obtain outlier indicator vector: $\lambda = \mathcal{I}(\pi^{-1}(\tilde{x}_{\chi v}) \geq \tilde{x}_{\chi v}[i_{cutoff}])$
16: draw Q-Q plots $\tilde{d}_{robust}$ vs $x_{\chi v}$.
17: end for
18: return $d_{robust}$; $\pi^{-1}(\tilde{x}_{\chi v})$, $\lambda \in \mathbb{R}^{nObserv}$ note: samples appear in the original order.

The pseudo-code includes two new outlier truncation strategies as follows:

A. Maximum Hull Distance Outlier Detection

The sorted robust distance sequence, $\tilde{d}_{robust}$, is paired up element-wise with the sorted $\chi^2$ quantiles, $\tilde{x}_{\chi v}$, to form a sequence of tuples $\{(\tilde{x}_{\chi v}[i], \tilde{d}_{robust}[i])\}$.

Each is treated as a point in convex-hull discussion.

Hull distance refers to the perpendicular distance of a point $(\tilde{x}_{\chi v}[i], \tilde{d}_{robust}[i])$ from the line L which extends from $P_0 = (\tilde{x}_{\chi v}[0], \tilde{d}_{robust}[0])$ to $P_{last} = (\tilde{x}_{\chi v}, \tilde{d}_{robust}[n_{Observ}-1])$. This measure is used to identify the "knee" of the curve. In practice, an adjustment is made. The point $P_{last}$ is replaced with $P_{i^*}$ where $i^* = \min\{n | \tilde{x}_{\chi v}[n] \leq 2\tilde{x}_{\chi v}[i_{chi2}^{conseiative}] - \tilde{x}_{\chi v}[i^{bold}_{chi2}]\}$ to ignore the most extreme outliers which can greatly exaggerate the slope.

Optimal truncation point: To minimise differences between the samples and the number of rejected/outlier samples, which are competing objectives that are to be satisfied simultaneously, the optimal truncation point ($i_{hd}^{max}$) may be defined as the point which subtends the largest hull distance to the line L as observed in the Q-Q plot.

To prevent excessive pruning, the accepted truncation point is restricted to $[i_{chi2}^{(conservative)}, c \times i_{chi2}^{(bold)}]$ where $c \geq 1$.

B. Maximum Silhouette Local-Search Outlier Detection

The two ideas underpinning this technique are the notions of self-consistency within a cluster, and a likelihood function associated with the cutoff point. In our application, there are only two clusters to consider, these contain the inlier and outlier samples, respectively. Data consistency within the inlier/outlier groups is informed by a weighted silhouette score which is evaluated over different group size combinations, $(n_{total} - i_{outlier}, i_{outlier})$, as the truncation point is varied. This effort is focused on a feasible region, where the evidence based on $r_{hd}$ offers a high degree of support. Formally, the search for the optimal truncation point is limited to the interval where $r_{hd}$ is within 95% of the peak, $\tilde{x}_{\chi v}[i_{hd}^{max}]$. For this reason, it may be viewed as a refinement technique over the maximum hull-distance strategy that takes into account data consistency and the cutoff likelihood.

The optimal truncation point ($i_{silhouette}^{max}$) maximises the sample-weighted silhouette score which is multiplied by a likelihood function calculated based on point density.

The silhouette score is computed over the hull distance plateau. This is defined as the support interval containing the peak where the hull distance has decayed to 95% of the maximum value.

Weights are used to elevate the importance of having a tight cluster for samples in the outlier group. Weighted silhouette score is computed as $$S = \frac{(1-w) \cdot s_{inlier} + w \cdot s_{outlier}}{(1-w) \cdot n_{inlier} + w \cdot n_{outlier}}$$

where $$w = \frac{\log_{10}(n_{outlier})}{\log_{10}(n_{inlier} + n_{outlier})}, \quad s_{outlier} = \sum_{i=0}^{n_{outlier}-1} s_i$$

and $$s_{inlier} = \sum_{i=n_{outlier}}^{n_{total}} s_i$$

Here $s_i$ represents the silhouette coefficient for sorted sample i.

Scaling by the relative likelihood biases the outlier threshold towards the center (pushes it to the right). This derives from the point density (observation frequency) function which is $\chi^2$-distributed. This prevents the cut being made in the sparse end (tail) which contains few samples.

An upper limit $i^{max}_{silhouette} \leq 2 \times i_{chi2}^{(bold)}$ is imposed as a safeguard to prevent excessive pruning.

Figure 11:
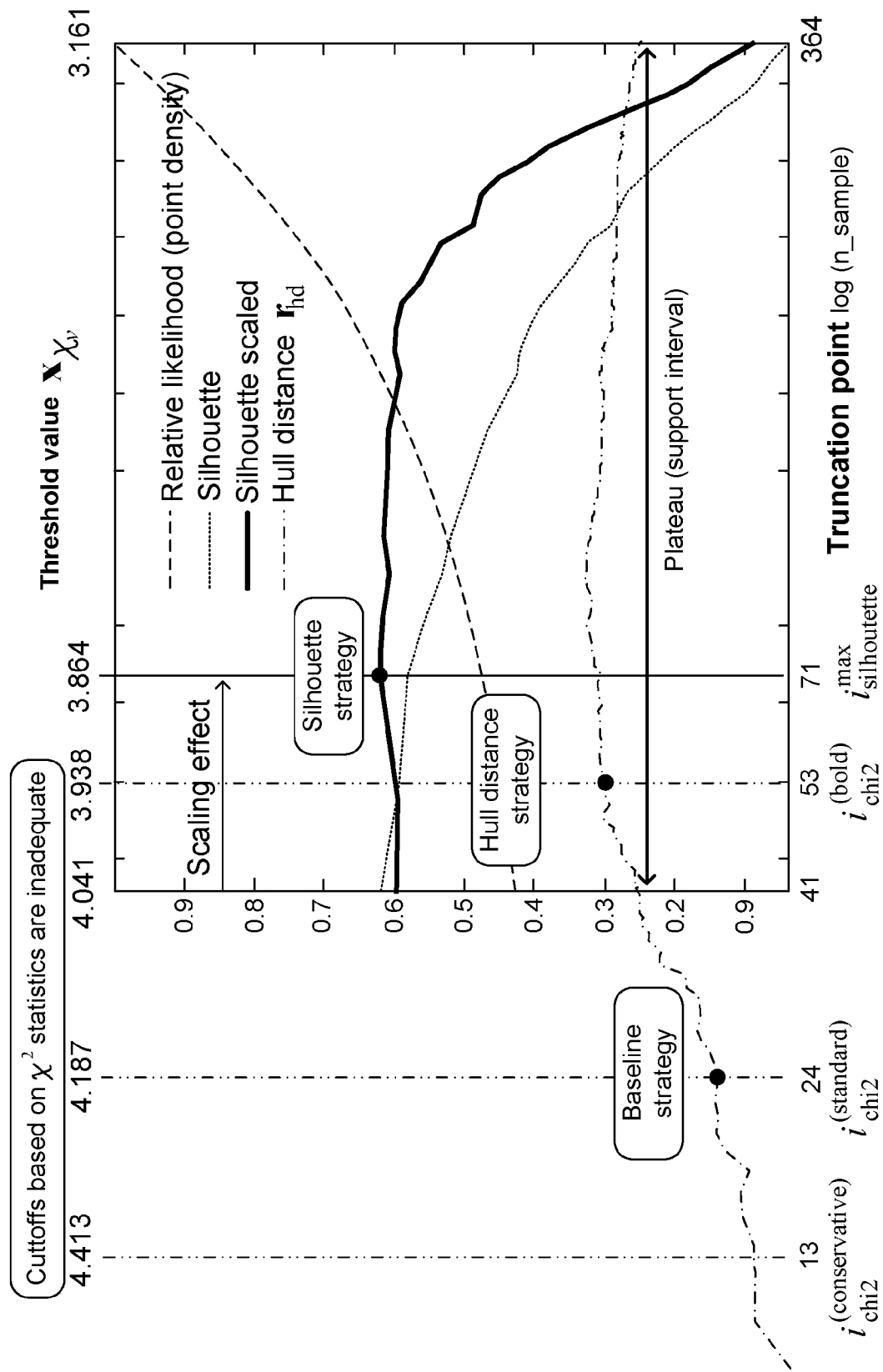
FIG. 11 is a chart indicating the use of hull distance and silhouette strategies for MCD-based clustering.

The key concepts are summarised in FIG. 11 which depicts outlier truncation strategy based on silhouette score and point density. The proposed strategies extend the power of the baseline method which may not be applicable when certain statistical assumptions are violated.

The Inventors have found that the elements and ratios included in the feature vector (see line 2 of the previous pseudo-code) affect the quality of the outlier detection.

Here, we highlight the differences between:
a) 10 elements+2 ratios: [Fe, SiO2, Al2O3, LOI, P, MgO, Mn, S, TiO2, CaO]+[Al2O3/SiO2, LOI/Al2O3]
b) 5 elements+2 ratios: [Fe, SiO2, Al2O3, LOI, P]+[Al$_2$O$_3$/SiO2, LOI/Al2O3]
c) 10 elements+3 ratios: [Fe, SiO2, Al2O3, LOI, P, MgO, Mn, S, TiO2, CaO]+[Al2O3/SiO2, LOI/Al2O3, TiO2/Fe]
d) 5 elements+3 ratios: [Fe, SiO2, Al2O3, LOI, P]+[Al$_2$O$_3$/SiO2, LOI/Al2O3, TiO2/Fe]

for a region which comprises ~1000 blasthole samples.

First, we consider the case where the variable supportFraction (line 3 of the pseudo-code) is set to 1 (all available samples are used for estimation). The supportFraction variable sets the proportion of points to be included in the support of raw MCD estimates. SupportFraction corresponds to $\eta$ in line 3 of the MCD pseudocode.

From running visualisations of the data processed according to the pseudocode, the Inventors have come to the belief that exclusion of certain trace elements (viz., MgO, Mn, S, CaO, TiO2) and noisy features (such as TiO2/Fe) can, in some instances, reduce scatter observed in the outlier cluster, making them more spatially coherent.

When the supportFraction is set to $\eta=0.75$ it was observed that sensitivity of the results to feature selection was reduced. Nonetheless, the chosen elements and ratios still affect how differences are viewed.

It was found that the baseline strategy (based on/critical values) consistently under-estimates the true number of outliers.

The subsequent strategies of hull distance and max silhouette were found to be able to detect more outliers [generally in closer agreement with the previously discussed t-SNE stochastic clustering results] and reduce the scatter in the boxplots.

Figure 12:
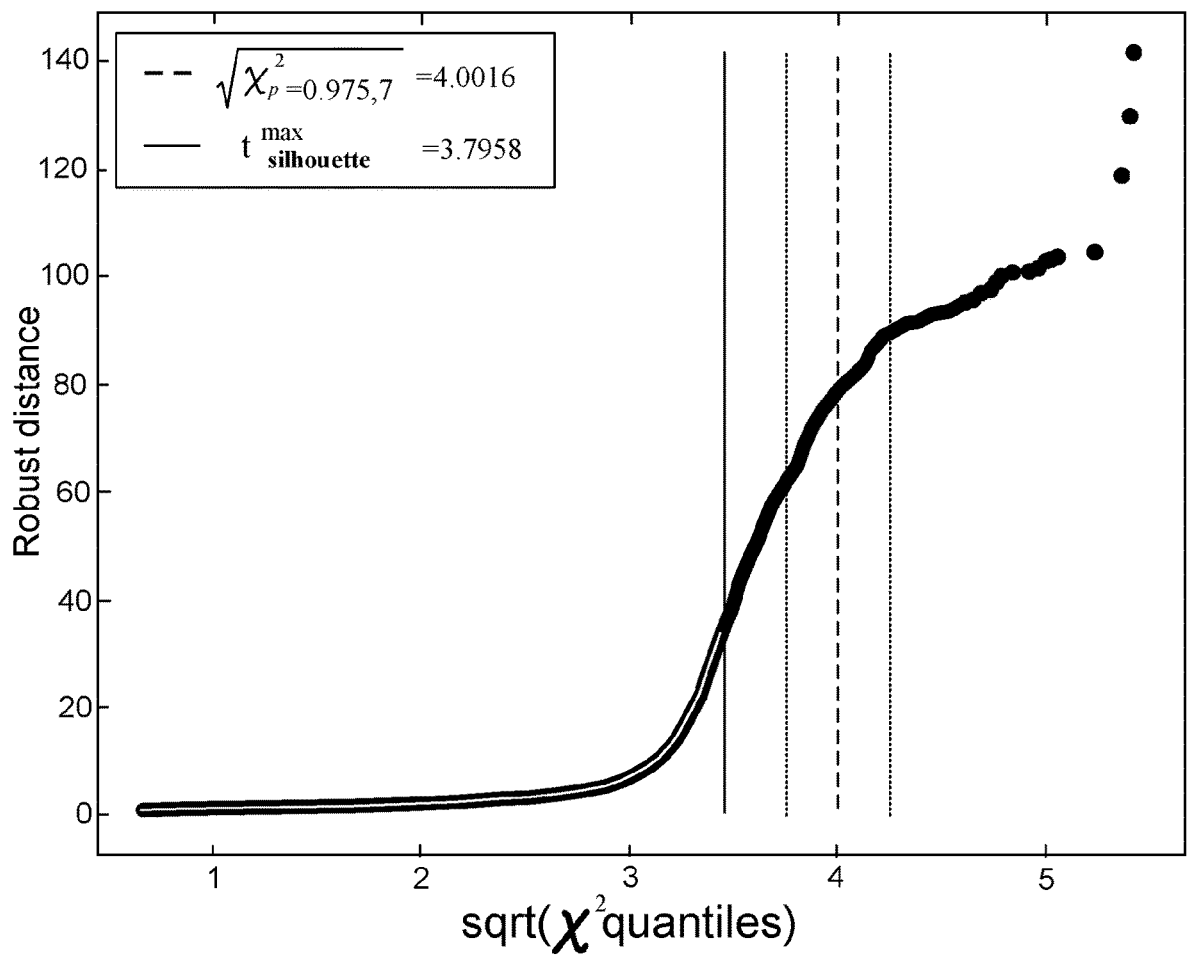
FIG. 12 is an MCD Q-Q plot for detecting outliers for a first set of assay sample parameters.
Figure 13:
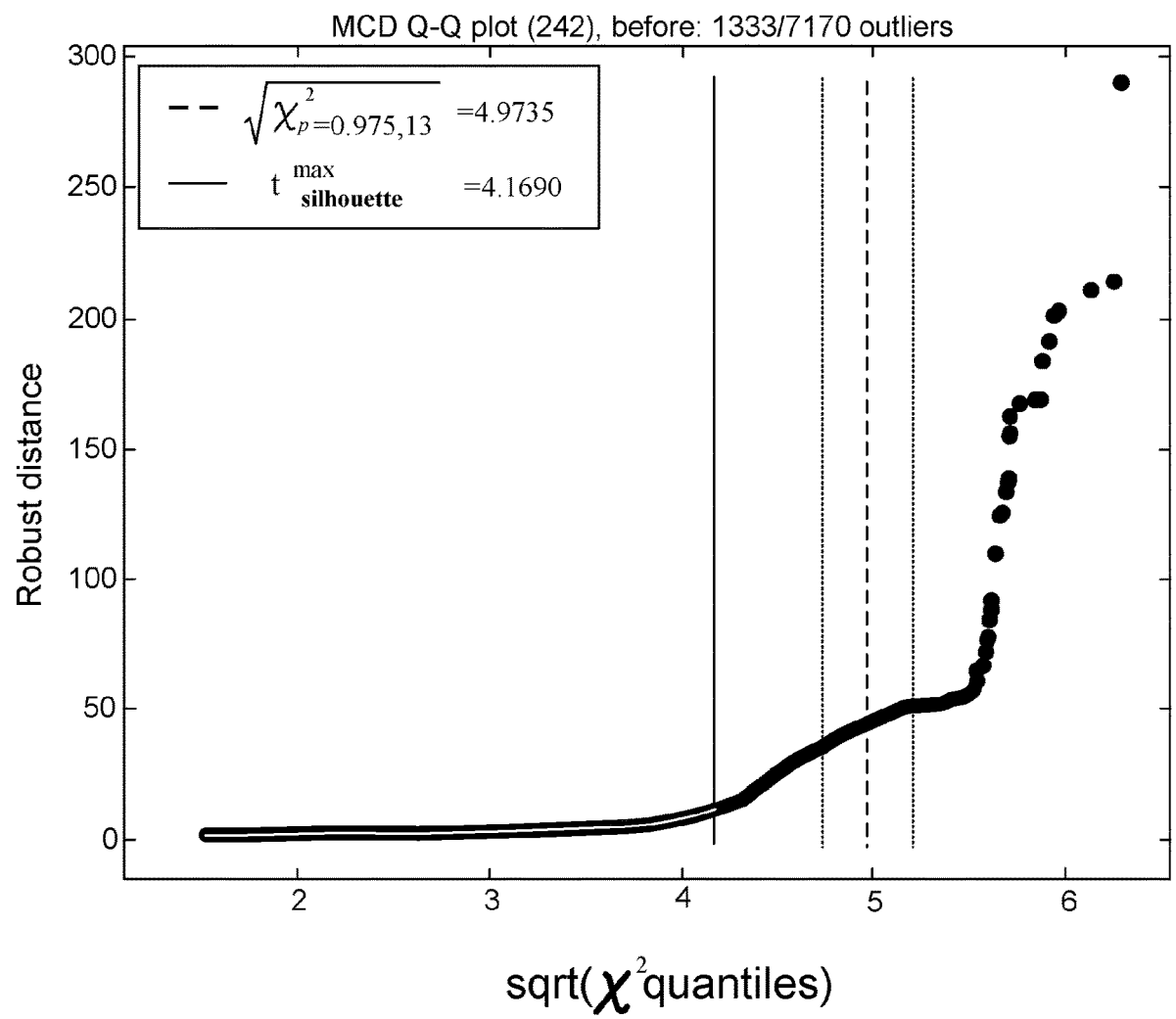
FIG. 13 is a second MCD Q-Q plot for detecting outliers for a second set of assay sample parameters.

Using more features may increase the number of outliers detected even though both solutions are equally valid. For example, it should be borne in mind that the selection of features changes both the cohesion (silhouette) measure and robust distance profile in the Q-Q plots of FIGS. 12 and 13.

The Inventors have found that it is better to use MCD than t-SNE for box 520 of FIG. 5, when outliers can be clustered into a single group. As the MCD truncation threshold decreases more samples are recognised as outliers. When using the preferred strategies of silhouetting and hull distance it was found that the MCD approach discovers nearly all the outliers identified by t-SNE. A high degree of spatial correlation between the user of t-SNE and MCD methods also emerged.

Some of the pros and cons that are believed to exist between the two methodologies for clustering at box 520 that have been described are as follows.

t-SNE—Pros and Cons

—Pros t-SNE can potentially identify multiple incongruous sub-domains when two or more groups of outliers with different chemical characteristics are present.

—Cons

Ensemble clustering (stochasticity) produces variable results and is computationally expensive.

Coverage provided by the minority clusters tend to be a conservative estimate of the total number of "real" outliers present.

MCD—Pros and Cons

—Pros

MCD is reliable in that it consistently identifies outliers.

A user can select custom threshold post-processing (e.g., query the database) to reject fewer or more outliers.

MCD is simple and efficient to compute.

—Cons

It is not possible to split outliers into subgroups (although potentially, MCD can be applied recursively to smaller subsets).

Box 525—Determine Boundaries for a Current Blast Assay Sample Elevation

In order to determine boundaries, all samples from the same domain and same cross-section (i.e. elevation or "mining bench") are numbered from 1 to n, initially each belonging to the cluster of 'self'. Neighboring samples within a radius of r are merged with the current sample and labeled with the minimum cluster index amongst the group. Cluster membership information is propagated iteratively until no further changes occur and S connected components remain.

For each connected component, boundary samples are identified by thresholding the local entropy, which is significantly non-zero at domain transition points. Suppose a sample n has $N_n$ neighbors within a radius of r and the fraction of samples belonging to domain g1 and domain g2 are $p_{n,1}$ and $p_{n,2}$ The local entropy is computed as $h_n = -\Sigma_i p_{n,1} \log_2(p_{n,1}+e)$. Sample n is marked as a boundary sample if $h_n \geq \max\{T_{entropy}, h_n^{(median)}\}$ where $T_{entropy}=0.5$ (which may be increased or decreased according to the specific situation) and $h^{(median)}$ [the median entropy in n's neighborhood] is used to suppress "non-maximum" responses.

One limitation of using an entropy measure as an edge detector is that the entropy tends to zero when the domain labels no longer vary. This creates a problem as boundaries remain essentially open at the frontiers of surveyed regions. To remedy this situation, orientation analysis can be performed to close these gaps. The objective is to recognize samples on the outskirts of a domain as edges.

Figure 5A:
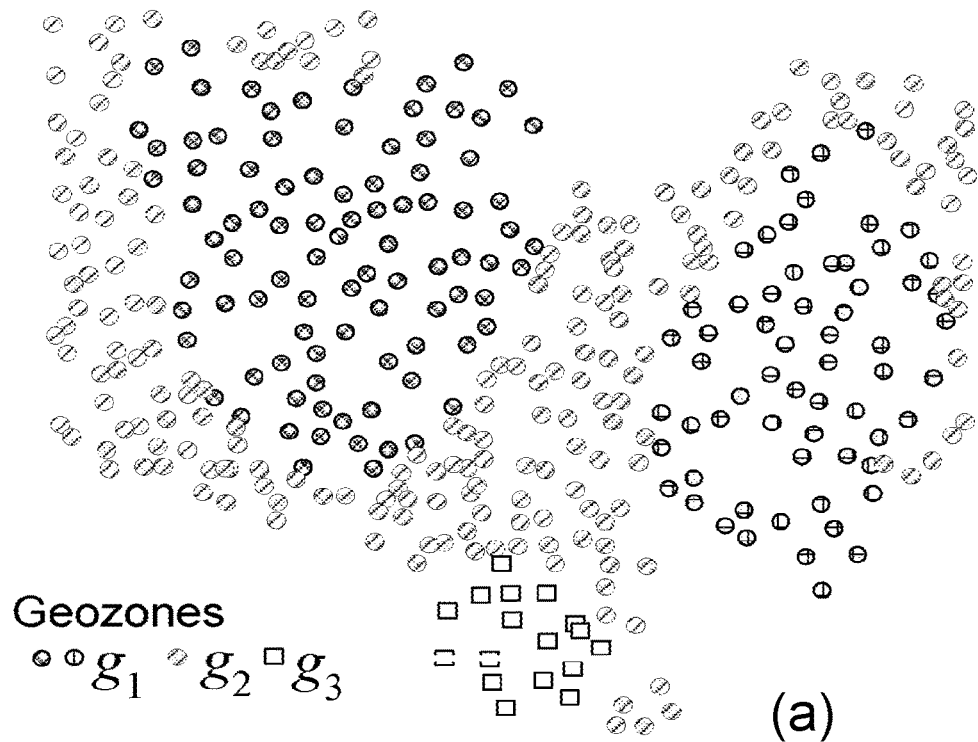
FIG. 5A illustrates blast hole sample boundary detection and boundary gap closure according to a preferred embodiment of the present invention.
Figure 5A:
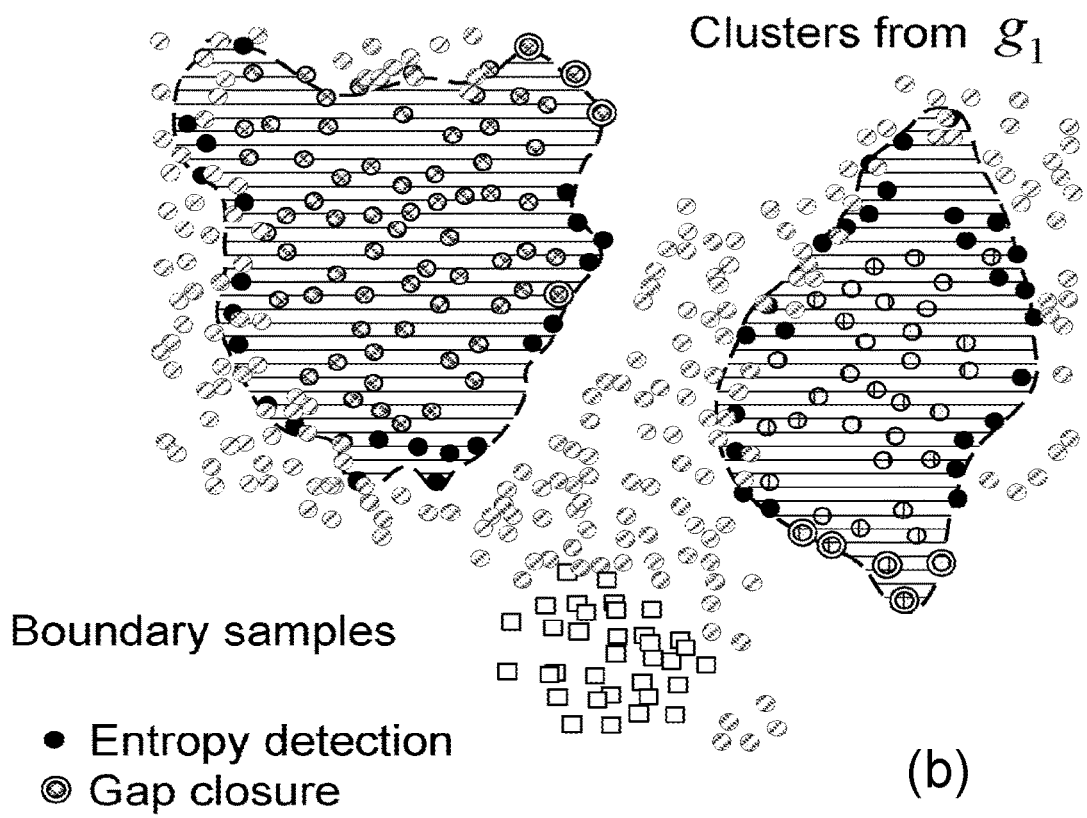

The direction of the $K_{orient}$ closest neighbors from n are computed and sorted in ascending order. If a gap larger than $T_{orient}$ radian is found, sample n is deemed to be on an open edge that needs to be closed. Considering the blastholes are often sampled on a hexagonal lattice, set $$T_{orient} = \frac{2}{3}\pi$$

and $K_{orient}=(4 \times 2\pi/T_{orient})=12$. Some intermediate results are illustrated in FIG. 5A. In FIG. 5A diagram (a) indicates the input blasthole coordinates and domain labels for the blast hole samples at one horizontal elevation. Diagram (b) of FIG. 5A illustrates two clusters (connected components) that have been identified in domain g1. The black dots represent boundary samples detected by thresholding local entropy, the red dots represent gap closure informed by orientation analysis.

Box 530—Adjust Exploratory Data Domain Boundary Model Using Surface Warping

Surface warping is a method for revising a domain surface generated from exploration drilling to take into account blast hole data.

Given a set of exploration assays for drill hole sections, tagged with validated domain interpretations, down-hole interpretation of geological domains in exploration (evaluation) drill holes; and blast hole assay samples for a set of production drill holes, not tagged with validated domains but assigned domains from their intersection with the domains of the sub-blocked resource model (and/or geological resource model volumes prior to sub-blocking)

then the objective of surface warping is to:

detect and utilise discrepancies between the blast hole values and the grades within the domains to thereby:

correct the domain at the location of the blast hole; and update the domain(s) in regions neighbouring the blast hole.

The updated 'warped' space can be applied in two ways. The most useful is to 'warp' an existing boundary surface between two domains, by modifying the vertices in the triangulation to better wrap around the new volumes. Alternatively, a naive approach can apply the new domains in a direct fashion to create a new sub-block-model by creating minimum-sized blocks around each sample and assigning to those blocks the new domain. However, this option does not update any explicit boundary surfaces, and may not honour the actual geology or the topology of the domains.

Overview of Surface Warping

Consider a field of displacement vectors at each point in space. A displacement of zero indicates that the estimate of the domain that should be located at that point is correct, whereas a displacement of [0,0,10] would indicate that the domain at that position is misplaced with an error-displacement of [0,0,10] and we should look into the original block model 10 m above to find a better domain to assign to the block at that position in a new, updated block model.

The assumption is that the basic structure of the block model is good, i.e. geologically reasonable on a resource evaluation scale, but the precise position and/or shape of features is inexact at the local/mining scale. Given this assumption, we expect the error-displacement to vary only a small amount from one position to any other nearby position. This then provides a useful way to extrapolate domain updates from one position (at the location of an assayed sample) to a nearby position (i.e. within a region yet to be drilled and sampled, such as the next mining bench). This extrapolation enables an improvement in the boundary modelling even where no data has been collected, improving the use of the model as a predictor.

The basic steps involved in the warping algorithm are:
Make a judgement of how 'likely' each sample belongs to any given domain
Based on that judgement, and given a prior domain structure, estimate the error-displacement at the location of every available sample
Extrapolate the error-displacement to surrounding regions on the assumption that the error-displacement is a smoothly varying function
Lookup the domain in the original block model or original geological model, after applying the best-estimated error-displacement.

Calculation of Domain Likelihoods for Each Sample

The warping technique requires a way to judge how likely it is that each blast hole sample belongs to any given domain.

The first step of the likelihood calculation looks at each blast hole assay individually. A number of techniques can and have been used to establish this likelihood, such as difference from the domain mean in one or more grade values, and class membership under pre-defined or machine learnt classification schemes.
Determine the grade properties of the domain—using exploration assays OR block model grade estimates for that domain OR some combination of both. Each domain has a distribution of grades within it, for each element measured/estimated.
Determine a dimensionality reduction of the grade properties of the domain. This may be using simple rules or be the output of a dimensionality reduction algorithm that seeks to minimise some cost or use some set of features.
Evaluate the likelihood that the blast hole sample belongs to each and every domain, using the properties of the domain above. The likelihood function could be some distance metric or some other similarity metric.

The second step considers the spatial viability. It is very unlikely that a sample belongs to domain X if there are no blocks/volumes of domain X nearby.
Apply a spatial filter over the likelihood results. This could be some threshold of maximum displacement, such as one parent-block's worth. eg, parent block from the sub-blocked model being a size chosen by the modelling geologist and thus encoding some knowledge of the expected range of influence or data density.
Keep only likelihood results for domains that fit within the spatial filter from the sample location.

Estimate Error-Displacement at Position of Each Sample

A likelihood for each domain at the position of each blast hole is now known. However, what the algorithm requires is a likelihood of error-displacement.

The next step is then a memory and CPU intensive sampling process to determine the error-displacement likelihood matrix.

This is an M×N matrix in which there are M samples and N possible displacements. The N possible displacements cover a discrete sampling of displacements up to the maximum displacement (typically ±[parent block dimension] metres). At the [m,n]th element we lookup the domain in the original block model at a position given by the location of the mth sample, displaced by the nth displacement. The error-displacement likelihood is then calculated as the corresponding domain likelihood, multiplied by the percentage of the sample length that actually overlaps that domain.

The result is, for each blast hole sample location, a distribution of displacement likelihoods.

Extrapolation into Neighbouring Regions and Domain Lookup

We then further estimate a displacement likelihood distribution at some other location, presumably where there are no available assayed samples, e.g. in the bench-below or neighbouring area within the same bench.

Various extrapolation techniques may be used at this stage, including Support Vector Machine, Gaussian Process or id-squared. The current implementation that is programmed for server 33 uses id-squared, both for simplicity and because it appears to be giving decent results.

The result is, again, a distribution of displacement likelihoods, but this time for the extrapolated location We then make the decision as to which displacement to use at the target location, based on a 'probability' distribution. We could choose the 'mean' position or may be some kind of 'median' position, but we deem the 'mode' (i.e. the maximum likelihood) displacement to be the most appropriate. In the event of a tie, we choose the displacement with the smallest magnitude.

Manipulation of Boundary Surface Triangulation

The approach for warping boundary surface triangulations is very similar to the above. Error displacements at each sample position are calculated as described previously. Rather than extrapolating these displacements to neighbouring regions in a sub-block pattern, they are instead applied only to the surface of interest.

In the simplest approach, the vertices of the surface are directly displaced, maintaining the existing triangulation between these vertices.

Due to the slight differences in the calculated displacement of adjacent points, simply displacing each point in the surface can lead to local, unrealistic, roughness in the final surface. To avoid this, rather than naively displacing the single point of each surface vertex, instead a grid of points at specified offsets to the original vertex are individually displaced, and the final point is displaced by the average displacement (rather than averaging the resulting points themselves). In this manner, the displacement is determined from the region around the point, and hence the final position for adjacent points varies more smoothly.

An improvement or alternative to this algorithm is also to sub-sample the space where the vertex density in the original triangulation is limited, and add in vertices, in order to create more smoothly varying triangulations in regions where either significant displacement, or more nuanced trending of the surface, is required.

Specification of the Warping Procedure

Figure 14:
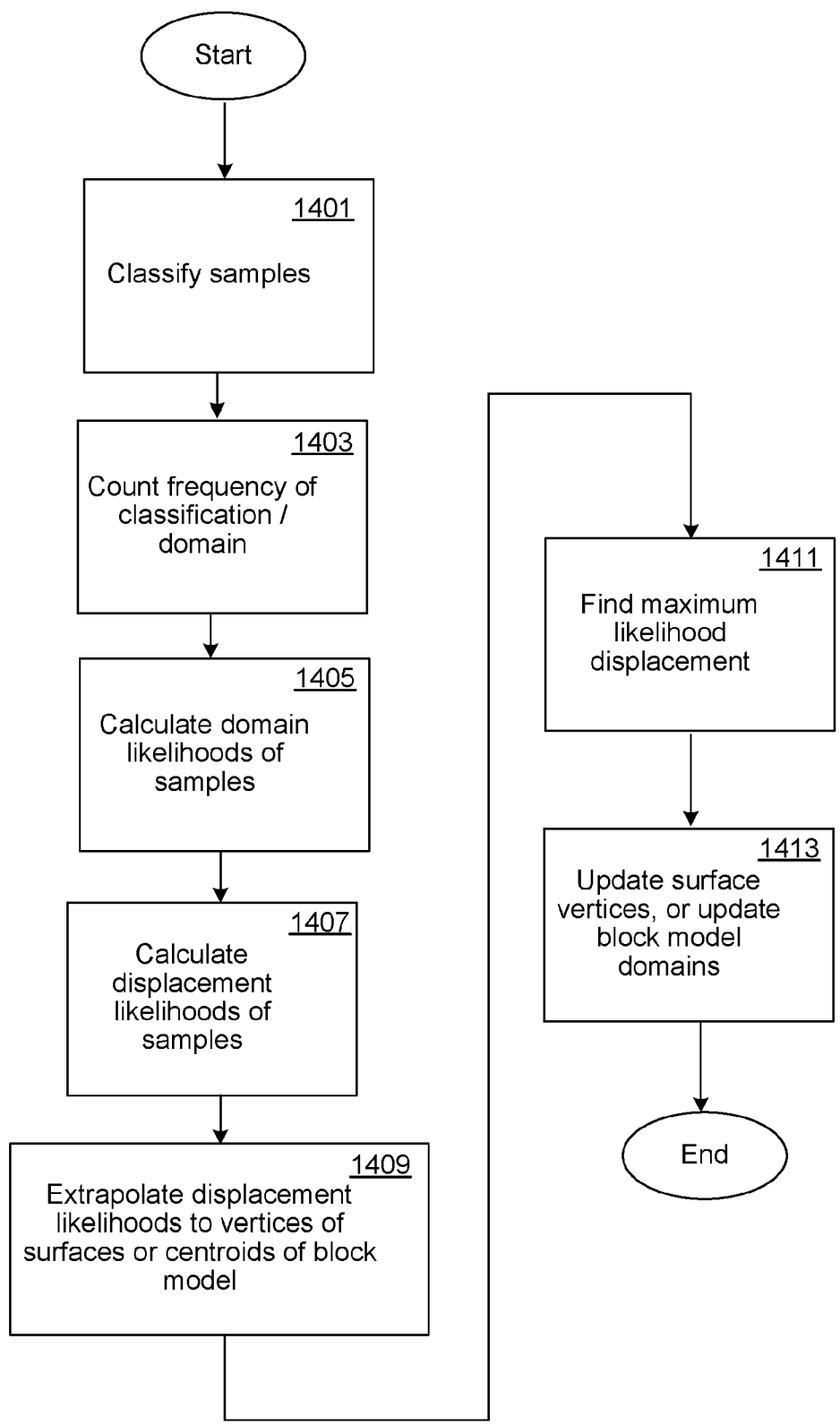
FIG. 14 is a flowchart of a surface warping procedure according to a preferred embodiment of the present invention.

FIG. 14 is a flowchart of a warping procedure according to a preferred embodiment of the present invention.

The following information is required to be available to perform the warping procedure:

$N_{samples}$ assayed samples, $0<n<N_{samples}$ each with associated:

$X_n$ being assay positions (eg easting=1000 metres, northing=2000 metres, elevation=650 metres)

$h_n$ being the vertical size of each sample (eg 12 metres)

$v_n$ being a vector of assay values (eg Fe=65%, Si=20%, P=0.1%, etc)

$g_n$ being human assigned domain interpretations, $0<g_n<N_{domains}$ (eg 0="stratum1 mineralised", 1="stratum 1 unmineralised", 2="dolerite dyke", etc)

$a_n=\{0,1\}$ being a coefficient that indicates whether gn is available and valid M query positions, $X'_m$, being either the centroids of blocks in a block model, or vertices of a mesh that delineates (unwarped) geological domains.

$r_i=R(X,h,i)$, being a function that determines the proportion $r_i$ of a sample (located at X and of size h) that intersects domain $0<i<N_{domains}$ as determined from the unwarped estimate of geological domains. This is typically implemented by spatial lookup of a discrete block model.

$E_j$, being a set of discrete displacements $0<j<N_{displacements}$, that are considered within the likely range of positional error for the unwarped geological domains (for example all displacements in multiples of dx=1, dy=1, dz=1 for which the magnitude is less than 10).

First, (at box 1401) the assay values, $v_n$, are classified into classes, $y_n$, $0<y_n<N_{classes}$ for each assay. This is achieved either using static rules that map the values, $v_n$ onto discrete classes (eg 0="high grade", 1="low grade", 2="sulfurous", etc) or if such rules are not available or appropriate, any convenient auto-clustering algorithm can be used.

To find: $F(y=i|g=j)$, being an $N_{classes} \times N_{domains}$ matrix containing the proportion of interpreted assays of any given domain g=j that have been classified as class y=i. This is calculated directly (at box 1403) by counting the classified samples and human provided interpretations:

$$F(y = i|g = j) = \frac{\sum_n a_n(y_n = i \text{ AND } g_n = j)}{\sum_n a_n(g_n = j)}$$

To find: $L_D(y_n|g_n=j)$, being an $N_{samples} \times N_{domains}$ matrix containing the likelihood of domain j for the $n^{th}$ assay (of known class $y_n$). This is taken directly from the class/domain frequency count for the observed class $y_n$ (at box 1405) as follows:

$$L_G(y_n|g_n=j)=F(y=y_n|g=j)$$

To find: $L_E(y_n|X_n,h_n,E_j)$, being an $N_{samples} \times N_{displacements}$ matrix containing the likelihood of displacement $E_j$, $0<j<N_{displacements}$ for the $n^{th}$ assay (of known class $y_n$) the following equation is implemented at box 1407.

$$L_E(y_n|X_n, h_n, E_j) = \sum_i L_G(y_n|g_n = i)R(X_n + E_j, h_n, i)$$

To find: $L_Q(X',E_j)$, being an $N_{displacement}$ vector containing the likelihood that the unwarped domain model is incorrect by a displacement of $E_j$ at some arbitrary position X'. This can be determined by any number of averaging functions, for example Gaussian Process or inverse-distance-squared. For purpose of illustration, a naive inverse-distance-squared solution is performed at box 1409 as follows:

$$L_Q(X', E_j) = \sum_n \frac{L_E(y_n|X_n, h_n, E_j)}{|X' - X_n|^2}$$

(It is considered naïve because division by zero is not handled so that the practical implementation considers nearby samples only)

In the case of surface warping, associated with X' there is a surface normal N' and it can be used to bias the displacement likelihoods away from displacements that are parallel to the surface (which are unproductive). In that case, $L_Q$ becomes:

$$L_Q(X', N', E_j) = \sum_n \frac{L_E(y_n|X_n, h_n, E_j)}{|X' - X_n|^2}(N' \cdot E_j)$$

where "·" denotes vector dot product.

To find: $E_{ML}(X')$, being the maximum-likelihood displacement at some arbitrary position X. This is achieved at box 1411 by finding the displacement with the maximum likelihood $L_Q(X', N', E_j)$.

$$E_{ML}(X') = \underset{E_j}{\mathrm{argmax}}\{L_Q(X', N', E_j)\}$$

At box 1413 for the case of surface warping, to find $X'_W$, being the position of a vertex of the warped mesh given its original position X' the following formula is implemented:

$$X'_W = X' + \sum_d \frac{E_{ML}(X' - D_d)}{N_{dither}}$$

where $D_d$ are a set of $N_{dither}$ discrete dithered offsets, centred about (0,0,0) created to apply a degree of smoothing to the displacement field. If no smoothing is desired, $D_d$ consists of a single zero displacement.

For the case of block-model warping, to find the maximum-likelihood domain at a block centroid X', the original block model is queried at the position $X'+E_{ML}(X')$.

Returning again to FIG. 5, at the conclusion of the procedure the adjusted exploratory data domain boundary model that is arrived at in box 530 is made available to mining operations so that mining of the domain can be conducted based on the adjusted surface. By having access to the updated domain boundary model, which has been adjusted with reference to the blast hole assay data, the efficiency of ore extraction is improved since mining of waste (i.e. non-domain regions) is reduced or avoided entirely.

Figure 15:
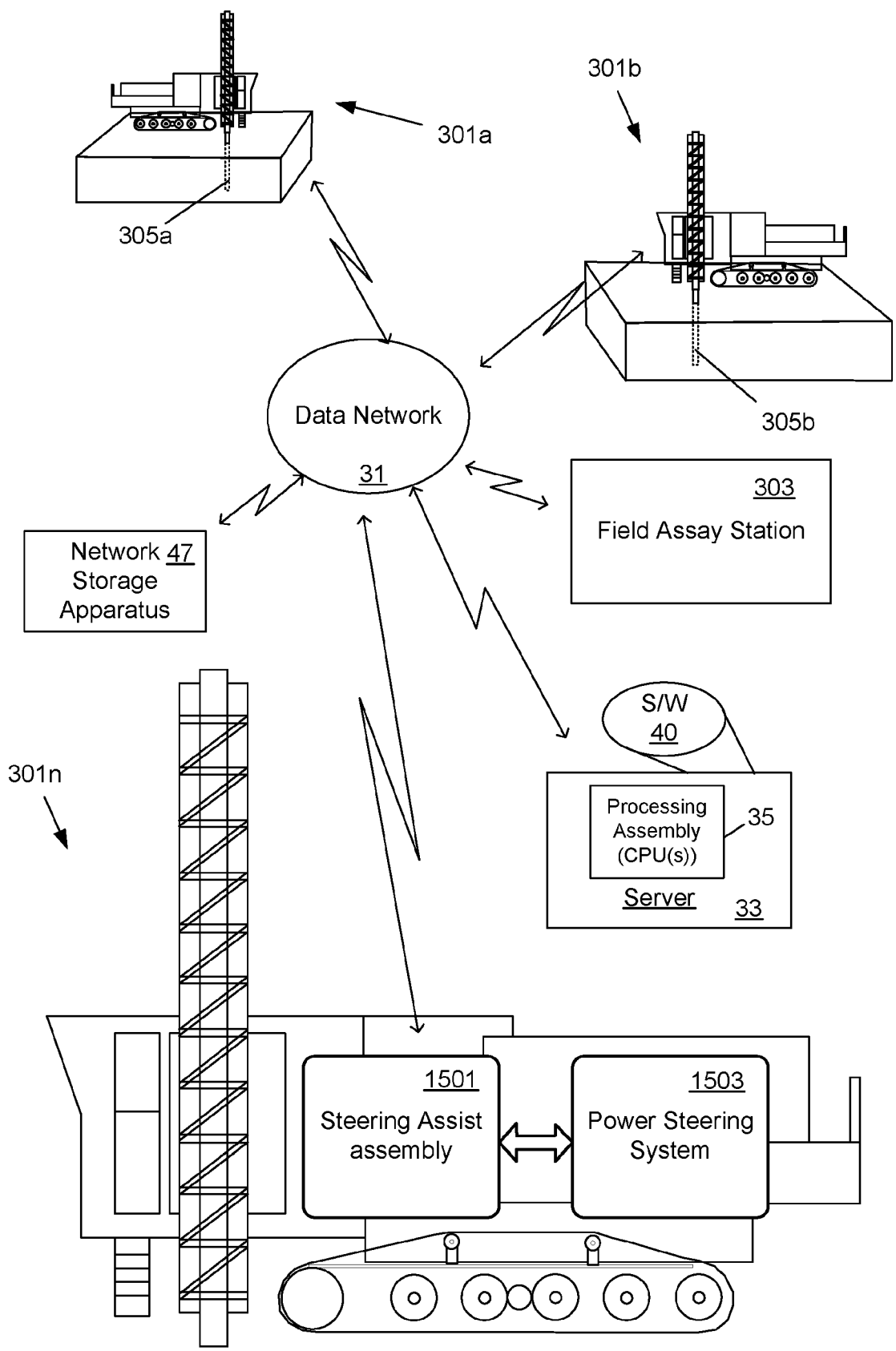
FIG. 15 is a block diagram of a mining guidance system according to a preferred embodiment of an aspect of the present invention.

With reference to FIG. 15, the methods described herein may be used to provide a mining guidance system 1500 for assisting in mining a geological domain of interest such as an ore deposit. In one embodiment of an aspect of the invention the mining guidance system 1500 includes a first plurality of blast hole drilling rigs such as rigs 301a, . . . ,301n that are suitable for producing blast hole samples. The system also includes at least one analysis assembly that is arranged to receive the blast hole samples. For example the analysis assembly could be a central field assay station such as station 303. Alternatively, the previously mentioned neutron radiation type down-hole assayers could be used on each drilling rig. In either case the analysis assemblies produce corresponding blast hole sample data which are transmitted as a data signal over data network 31 to a network data storage device. The network data storage device may be a suitable data storage drive of a server such as secondary storage 47 (item 47 of FIG. 4) or a dedicated data storage apparatus 47 as shown in FIG. 15 or a cloud storage facility. The network storage apparatus 47 stores an exploratory model of the geological domain of interest such as the vertices model that is visualized in FIG. 1C.

The guidance system also includes the computer server 33 which is programmed with the model adjustment software (e.g. Domain Boundary Updater Software Product 40) to receive and process the blast hole sample data from the at least one analysis assemblies for a number of positions in proximity to the geological domain of interest. Under control of the software 40 a processing assembly in the form of CPUs 35 of server 33 adjust the exploratory model based on the blast hole sample data to produce an adjusted domain model. The adjusted domain model is stored by the server in the secondary data storage 47. The guidance system also includes a second plurality of blast hole drilling rigs (which could be the same or at least have some of the rigs 301a, . . . 301n). Each of the second plurality of blast hole drilling rigs include a steering assist assembly 1501 which can be in the form of a visual electronic display for reference by human operators of the rig or alternatively an automatic steering system that couples to power steering system 1503 of each rig. The steering assist assembly 1501 of each rig is in data communication with the network data storage device 47 via network 31 and is preferably GPS enabled to effect steering of the rig relative to the geological domain with reference to the adjusted domain model for accurate mining of the geological domain. Consequently, the rig is steered with reference to the updated and accurate model so that ore extraction is maximized and the inadvertent mining of waste is avoided.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described herein comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the scope of the invention.

The invention claimed is:

1. A method for adjusting a surface of an exploratory data model of a geological domain to take into account blast hole data, the method comprising;
   drilling a plurality of blast holes proximal to the geological domain;
   recording blast hole data samples including positional data and assay data for each of the blast holes in an electronic data storage apparatus;
   operating a processing assembly in data communication with said storage apparatus according to instructions stored in a memory accessible to the processing assembly to perform the following acts:
      labelling each said data sample as domain or non-domain based on the assay data;
      determining blast hole boundary samples from the blast hole data samples for the geological domain at each of a number of elevations to produce blast hole boundaries for the geological domain;
      comparing the blast hole boundaries to a surface of the exploratory data model;
      adjusting the surface based on the blast hole boundaries for the geological domain to generate an adjusted surface; and
   mining the geological domain based on the adjusted surface to thereby improve efficiency of ore extraction.

2. The method of claim 1, wherein adjusting the surface includes displacing points of the exploratory data model defining the surface to reduce error between the surface and the blast hole boundaries.

3. The method of claim 1, wherein adjusting the surface of the exploratory data model includes extrapolating to make further adjustments to the said surface at one or more levels beneath a current elevation of the blast hole data.

4. The method of claim 1 wherein the determining of blast hole boundary samples includes associating a domain likelihood with each of the blast hole data samples.

5. The method of claim 4 including disregarding likelihood results for domains that are spatially displaced from the blast hole data samples by more than a threshold value.

6. The method of claim 4, including calculating an error-displacement likelihood for each of the blast hole data samples.

7. The method of claim 6, including determining the error-displacement likelihood of the domain by multiplying the domain likelihood for each blast hole data sample by a percentage of the sample length overlapping said domain.

8. The method of claim 6 including estimating a displacement likelihood distribution at a location where blast hole data samples have not been taken.

9. The method of claim 8, wherein the step of estimating a displacement likelihood distribution at the location where blast hole data samples have not been taken is performed by extrapolation using any one of: a Support Vector Machine, a Gaussian Process or an inverse-distance-squared procedure.

10. The method of claim 8 including applying a displacement from the displacement likelihood distribution to the surface of the exploratory data model to generate the adjusted surface.

11. The method of claim 1, wherein determining blast hole boundaries for the geological domain at each of a number of elevations comprises identifying domain data samples neighboring non-domain data samples at each of the elevations.

12. The method of claim 11, wherein the determining blast hole boundaries based on domain data samples neighboring non-domain data samples at each of the elevations comprises calculating a local entropy value for domain data samples neighboring non-domain data samples and deeming a sample to be a boundary sample upon the local entropy value exceeding a threshold value.

13. The method of claim 1 including operating the processing assembly to discard outlier samples by performing data sample clustering for the blast hole data samples.

14. The method of claim 13, including operating the processing assembly to perform the clustering by detecting multivariate outliers of the blast hole data samples.

15. The method of claim 14 comprising operating the processing assembly to perform a Minimum Covariance Discriminant (MCD) based procedure on the blast hole data samples to detect outliers.

16. The method of claim 15, wherein the MCD based procedure includes maximum hull distance outlier detection.

17. The method of claim 16, wherein the MCD based procedure further includes maximum silhouette local-search outlier detection.

18. The method of claim 13, including operating the processing assembly to discard outlier samples by applying a t-distributed Stochastic Neighbor Embedding (t-SNE) based procedure to the blast hole data samples to detect outliers.

19. The method of claim 18, wherein the t-SNE based procedure includes spectral clustering to group together samples having similar characteristics to thereby segregate the outliers.

20. The method of claim 19 including ensemble clustering to detect stable clusters over multiple applications of t-SNE.

* * * * *